US012574891B2

(12) United States Patent　　(10) Patent No.:　US 12,574,891 B2
　　 Li　　　　　　　　　　　　　　(45) Date of Patent:　　Mar. 10, 2026

(54) RELATIVE POSITIONING METHOD AND APPARATUS, AND READABLE STORAGE MEDIUM

(71) Applicant: DATANG MOBILE COMMUNICATIONS EQUIPMENT CO., LTD., Beijing (CN)

(72) Inventor: Jianxiang Li, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 296 days.

(21) Appl. No.: 18/548,103

(22) PCT Filed: Mar. 21, 2022

(86) PCT No.: PCT/CN2022/082099
§ 371 (c)(1),
(2) Date: Aug. 28, 2023

(87) PCT Pub. No.: WO2022/199550
PCT Pub. Date: Sep. 29, 2022

(65) Prior Publication Data
US 2024/0137900 A1　　Apr. 25, 2024
US 2024/0236918 A9　　Jul. 11, 2024

(30) Foreign Application Priority Data

Mar. 26, 2021　(CN) .......................... 202110328328.6

(51) Int. Cl.
H04W 64/00　　　(2009.01)
H04L 5/00　　　(2006.01)
(52) U.S. Cl.
CPC ........... H04W 64/00 (2013.01); H04L 5/0051 (2013.01)

(58) Field of Classification Search
CPC ..... H04W 4/023; H04W 64/00; H04W 76/14; H04W 92/18; H04L 5/0051; G01S 5/0072; G01S 5/0249; G01S 5/0284
See application file for complete search history.

(56) References Cited

U.S. PATENT DOCUMENTS

2016/0095080 A1　　3/2016　Khoryaev et al.
2018/0324548 A1　　11/2018　Venkatraman et al.
(Continued)

FOREIGN PATENT DOCUMENTS

CN　　106662634 A　　5/2017
CN　　110536234 A　　12/2019
(Continued)

OTHER PUBLICATIONS

State Intellectual Property Office of the People's Republic of China, Office Action and Search Report Issued in Application No. 202110328328.6, May 8, 2024, 23 pages.
(Continued)

*Primary Examiner* — Nader Bolourchi
(74) *Attorney, Agent, or Firm* — KILPATRICK TOWNSEND & STOCKTON LLP

(57) ABSTRACT

The present application provides a relative positioning method and apparatus, and a readable storage medium, applied to a first terminal device which is connected to a second terminal device through a direct communication link, the method includes: transmitting a first relative positioning reference signal to the second terminal device, and receiving a second relative positioning reference signal transmitted by the second terminal device; determining a first positioning parameter corresponding to the received second relative positioning reference signal and the first relative positioning reference signal; receiving a second positioning parameter transmitted by the second terminal device, where the second positioning parameter is determined by the second terminal (Continued)

S101
Transmitting a first relative positioning reference signal to the second terminal device, and receiving a second relative positioning reference signal transmitted by the second terminal device S102
Determining a first positioning parameter corresponding to the received second relative positioning reference signal and the first relative positioning reference signal S103
Receiving a second positioning parameter transmitted by the second terminal device, where the second positioning parameter is determined by the second terminal based on the received first relative positioning reference signal and the second relative positioning reference signal S104
Determining, based on the first positioning parameter and the second positioning parameter, a relative position between the first terminal device and the second terminal device based on the received first relative positioning reference signal and the second relative positioning reference signal; and determining, based on the first positioning parameter and the second positioning parameter, a relative position between the first terminal device and the second terminal device.

20 Claims, 12 Drawing Sheets

(56) References Cited

U.S. PATENT DOCUMENTS

| | | |
|---|---|---|
| 2019/0069260 A1 | 2/2019 | Chae et al. |
| 2019/0230618 A1 | 7/2019 | Saur et al. |
| 2019/0239181 A1* | 8/2019 | Gangakhedkar ...... H04W 76/10 |
| 2020/0229124 A1* | 7/2020 | Soriaga ................. H04W 4/023 |
| 2020/0367193 A1* | 11/2020 | Cha ........................ G01S 5/0236 |
| 2021/0359813 A1* | 11/2021 | Huang .................. H04W 24/04 |
| 2022/0043099 A1* | 2/2022 | Da ......................... H04L 5/0048 |
| 2022/0236365 A1* | 7/2022 | Ko ........................... G01S 7/006 |
| 2022/0279310 A1* | 9/2022 | Xiao ..................... H04W 4/023 |
| 2022/0326335 A1* | 10/2022 | Ko ........................ G01S 5/0072 |
| 2022/0361142 A1* | 11/2022 | Ko ...................... H04W 56/005 |
| 2023/0232370 A1 | 7/2023 | Yang |

FOREIGN PATENT DOCUMENTS

| | | |
|---|---|---|
| CN | 111343579 A | 6/2020 |
| CN | 111526575 A | 8/2020 |
| CN | 111989585 A | 11/2020 |
| CN | 112237035 A | 1/2021 |
| WO | 2016048509 A1 | 3/2016 |
| WO | 2018068817 A1 | 4/2018 |
| WO | 2020125310 A1 | 6/2020 |
| WO | 2020146131 A1 | 7/2020 |
| WO | 2020177041 A1 | 9/2020 |
| WO | 2020246842 A1 | 12/2020 |
| WO | 2020256311 A1 | 12/2020 |
| WO | 2020256365 A1 | 12/2020 |
| WO | 2021000680 A1 | 1/2021 |

OTHER PUBLICATIONS

ISA State Intellectual Property Office of the People's Republic of China, International Search Report and Written Opinion issued in Application No. PCT/CN2022/082099, Jun. 10, 2022, WIPO, 13 pages.

The extended European search report received in the counterpart European Application 22774209.5, mailed on Aug. 8, 2024.

The second office action and search report issued in Chinese counterpart application 202110328328.6, mailed on Oct. 24, 2024.

Xue, Songdong, "Robot Target Search Based on Relative Positioning Mechanism", Swarm Robotic Coordinated Control, Chapter 4, pp. 53-58, 2016.

* cited by examiner

-- PRIOR ART --

-- PRIOR ART --

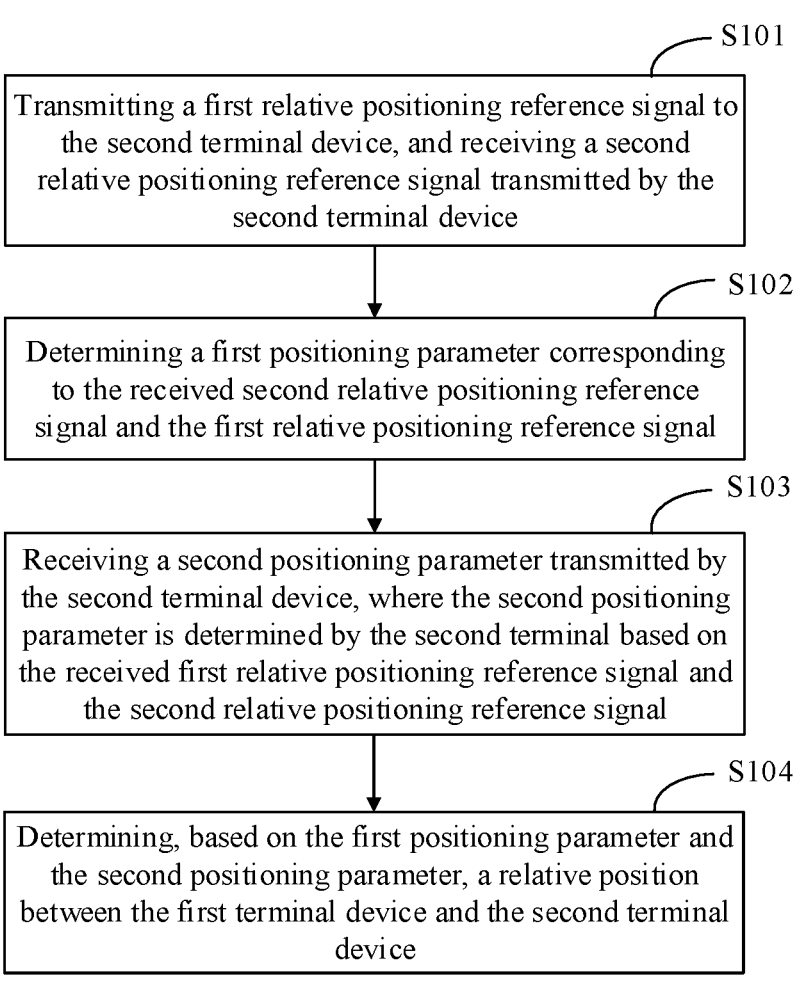

S101

Transmitting a first relative positioning reference signal to the second terminal device, and receiving a second relative positioning reference signal transmitted by the second terminal device

S102

Determining a first positioning parameter corresponding to the received second relative positioning reference signal and the first relative positioning reference signal

S103

Receiving a second positioning parameter transmitted by the second terminal device, where the second positioning parameter is determined by the second terminal based on the received first relative positioning reference signal and the second relative positioning reference signal

S104

Determining, based on the first positioning parameter and the second positioning parameter, a relative position between the first terminal device and the second terminal device

FIG. 4

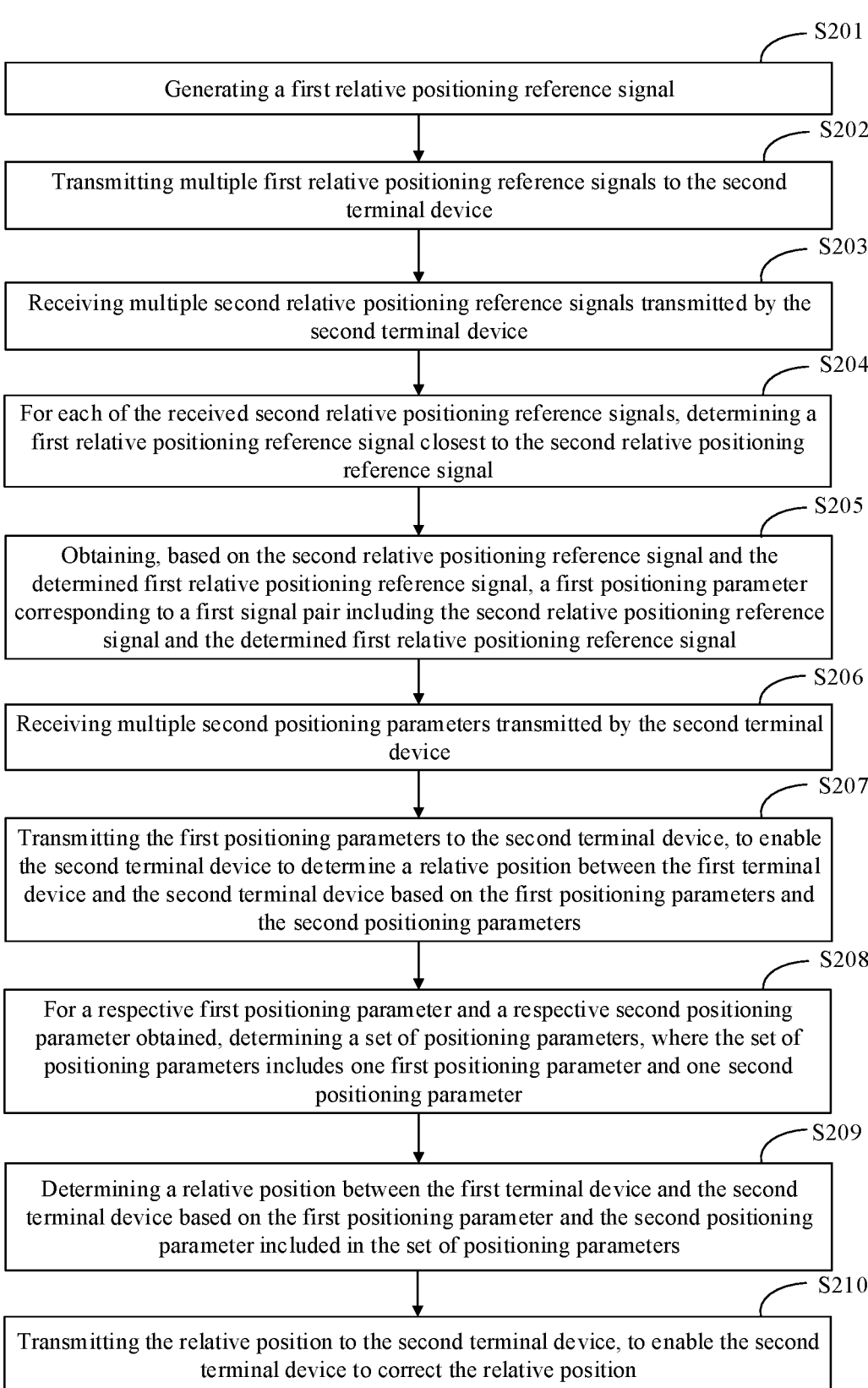

S201

Generating a first relative positioning reference signal

S202

Transmitting multiple first relative positioning reference signals to the second terminal device

S203

Receiving multiple second relative positioning reference signals transmitted by the second terminal device

S204

For each of the received second relative positioning reference signals, determining a first relative positioning reference signal closest to the second relative positioning reference signal

S205

Obtaining, based on the second relative positioning reference signal and the determined first relative positioning reference signal, a first positioning parameter corresponding to a first signal pair including the second relative positioning reference signal and the determined first relative positioning reference signal

S206

Receiving multiple second positioning parameters transmitted by the second terminal device

S207

Transmitting the first positioning parameters to the second terminal device, to enable the second terminal device to determine a relative position between the first terminal device and the second terminal device based on the first positioning parameters and the second positioning parameters

S208

For a respective first positioning parameter and a respective second positioning parameter obtained, determining a set of positioning parameters, where the set of positioning parameters includes one first positioning parameter and one second positioning parameter

S209

Determining a relative position between the first terminal device and the second terminal device based on the first positioning parameter and the second positioning parameter included in the set of positioning parameters

S210

Transmitting the relative position to the second terminal device, to enable the second terminal device to correct the relative position

FIG. 6

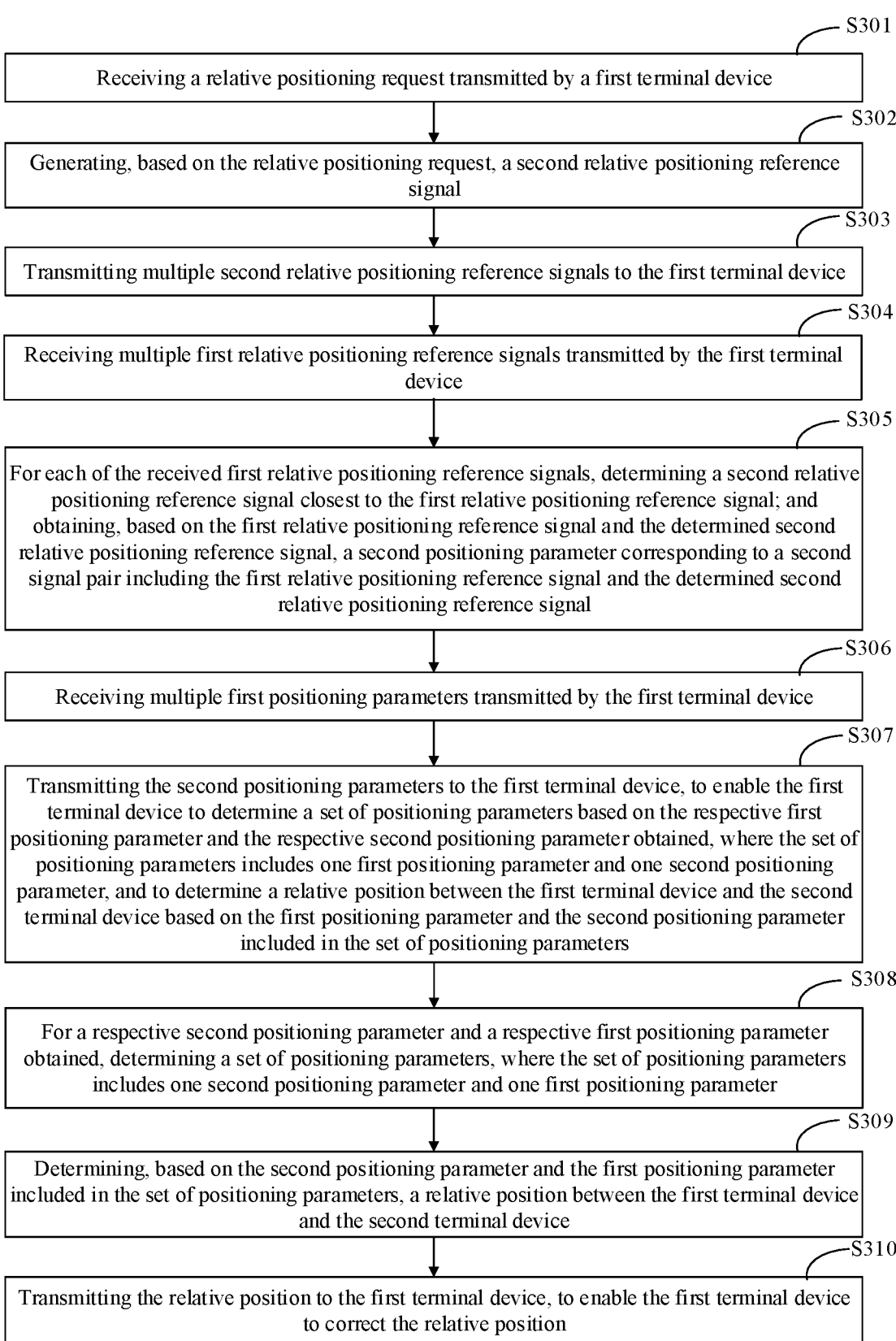

S301

Receiving a relative positioning request transmitted by a first terminal device

S302

Generating, based on the relative positioning request, a second relative positioning reference signal

S303

Transmitting multiple second relative positioning reference signals to the first terminal device

S304

Receiving multiple first relative positioning reference signals transmitted by the first terminal device

S305

For each of the received first relative positioning reference signals, determining a second relative positioning reference signal closest to the first relative positioning reference signal; and obtaining, based on the first relative positioning reference signal and the determined second relative positioning reference signal, a second positioning parameter corresponding to a second signal pair including the first relative positioning reference signal and the determined second relative positioning reference signal

S306

Receiving multiple first positioning parameters transmitted by the first terminal device

S307

Transmitting the second positioning parameters to the first terminal device, to enable the first terminal device to determine a set of positioning parameters based on the respective first positioning parameter and the respective second positioning parameter obtained, where the set of positioning parameters includes one first positioning parameter and one second positioning parameter, and to determine a relative position between the first terminal device and the second terminal device based on the first positioning parameter and the second positioning parameter included in the set of positioning parameters

S308

For a respective second positioning parameter and a respective first positioning parameter obtained, determining a set of positioning parameters, where the set of positioning parameters includes one second positioning parameter and one first positioning parameter

S309

Determining, based on the second positioning parameter and the first positioning parameter included in the set of positioning parameters, a relative position between the first terminal device and the second terminal device

S310

Transmitting the relative position to the first terminal device, to enable the first terminal device to correct the relative position

FIG. 7

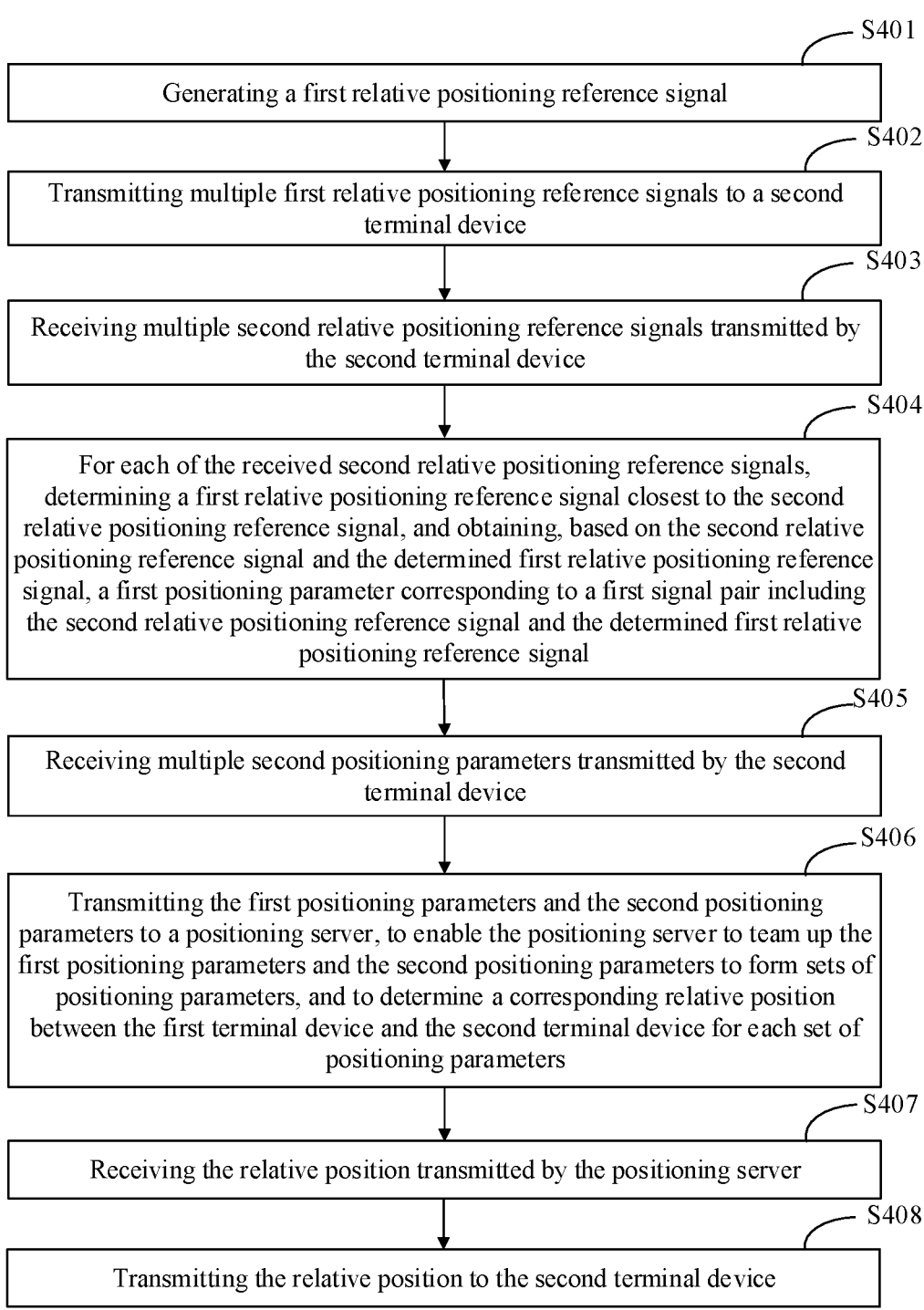

S401

Generating a first relative positioning reference signal

S402

Transmitting multiple first relative positioning reference signals to a second terminal device

S403

Receiving multiple second relative positioning reference signals transmitted by the second terminal device

S404

For each of the received second relative positioning reference signals, determining a first relative positioning reference signal closest to the second relative positioning reference signal, and obtaining, based on the second relative positioning reference signal and the determined first relative positioning reference signal, a first positioning parameter corresponding to a first signal pair including the second relative positioning reference signal and the determined first relative positioning reference signal

S405

Receiving multiple second positioning parameters transmitted by the second terminal device

S406

Transmitting the first positioning parameters and the second positioning parameters to a positioning server, to enable the positioning server to team up the first positioning parameters and the second positioning parameters to form sets of positioning parameters, and to determine a corresponding relative position between the first terminal device and the second terminal device for each set of positioning parameters

S407

Receiving the relative position transmitted by the positioning server

S408

Transmitting the relative position to the second terminal device

FIG. 8

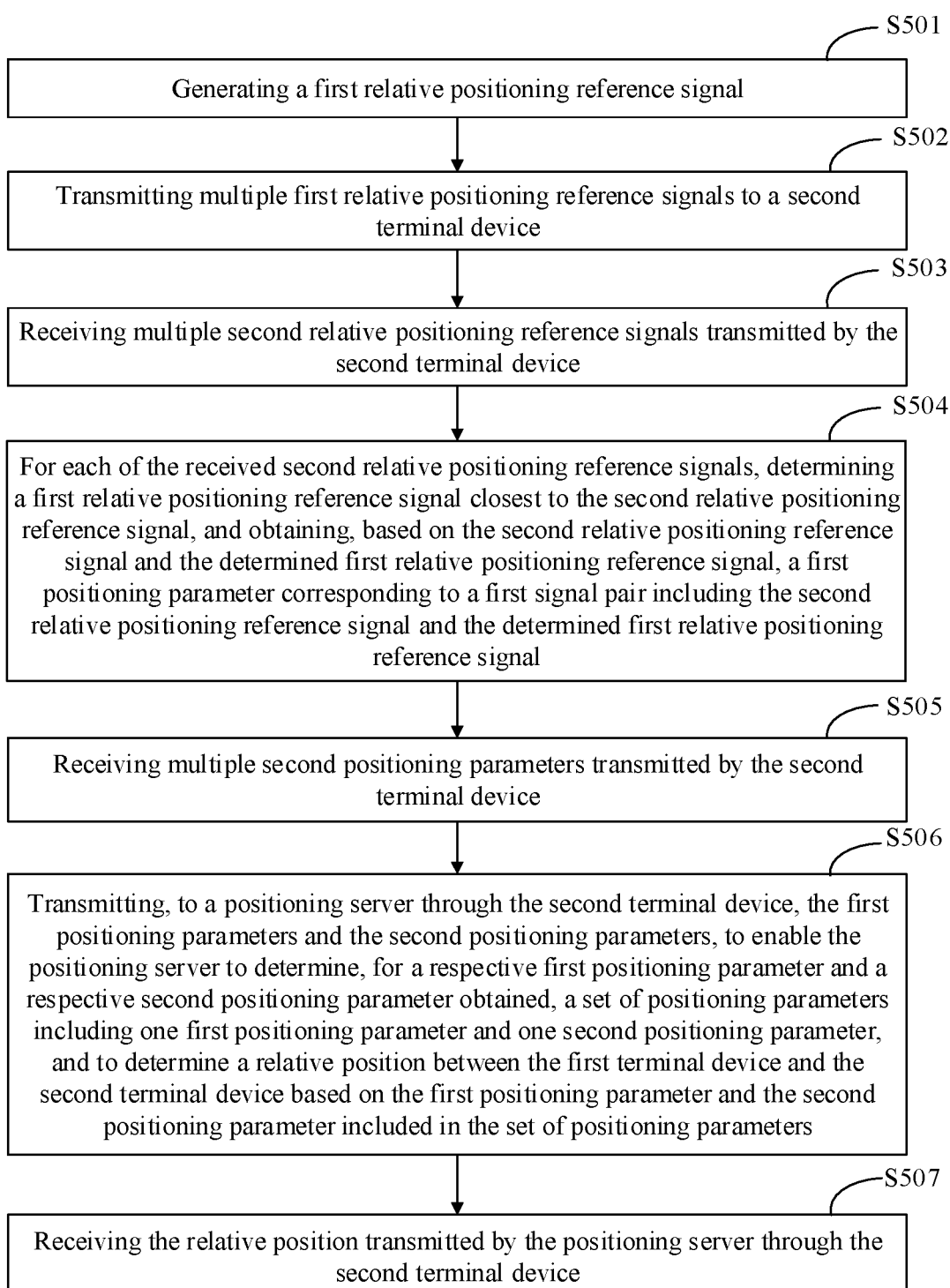

S501

Generating a first relative positioning reference signal

S502

Transmitting multiple first relative positioning reference signals to a second terminal device

S503

Receiving multiple second relative positioning reference signals transmitted by the second terminal device

S504

For each of the received second relative positioning reference signals, determining a first relative positioning reference signal closest to the second relative positioning reference signal, and obtaining, based on the second relative positioning reference signal and the determined first relative positioning reference signal, a first positioning parameter corresponding to a first signal pair including the second relative positioning reference signal and the determined first relative positioning reference signal

S505

Receiving multiple second positioning parameters transmitted by the second terminal device

S506

Transmitting, to a positioning server through the second terminal device, the first positioning parameters and the second positioning parameters, to enable the positioning server to determine, for a respective first positioning parameter and a respective second positioning parameter obtained, a set of positioning parameters including one first positioning parameter and one second positioning parameter, and to determine a relative position between the first terminal device and the second terminal device based on the first positioning parameter and the second positioning parameter included in the set of positioning parameters

S507

Receiving the relative position transmitted by the positioning server through the second terminal device

FIG. 9

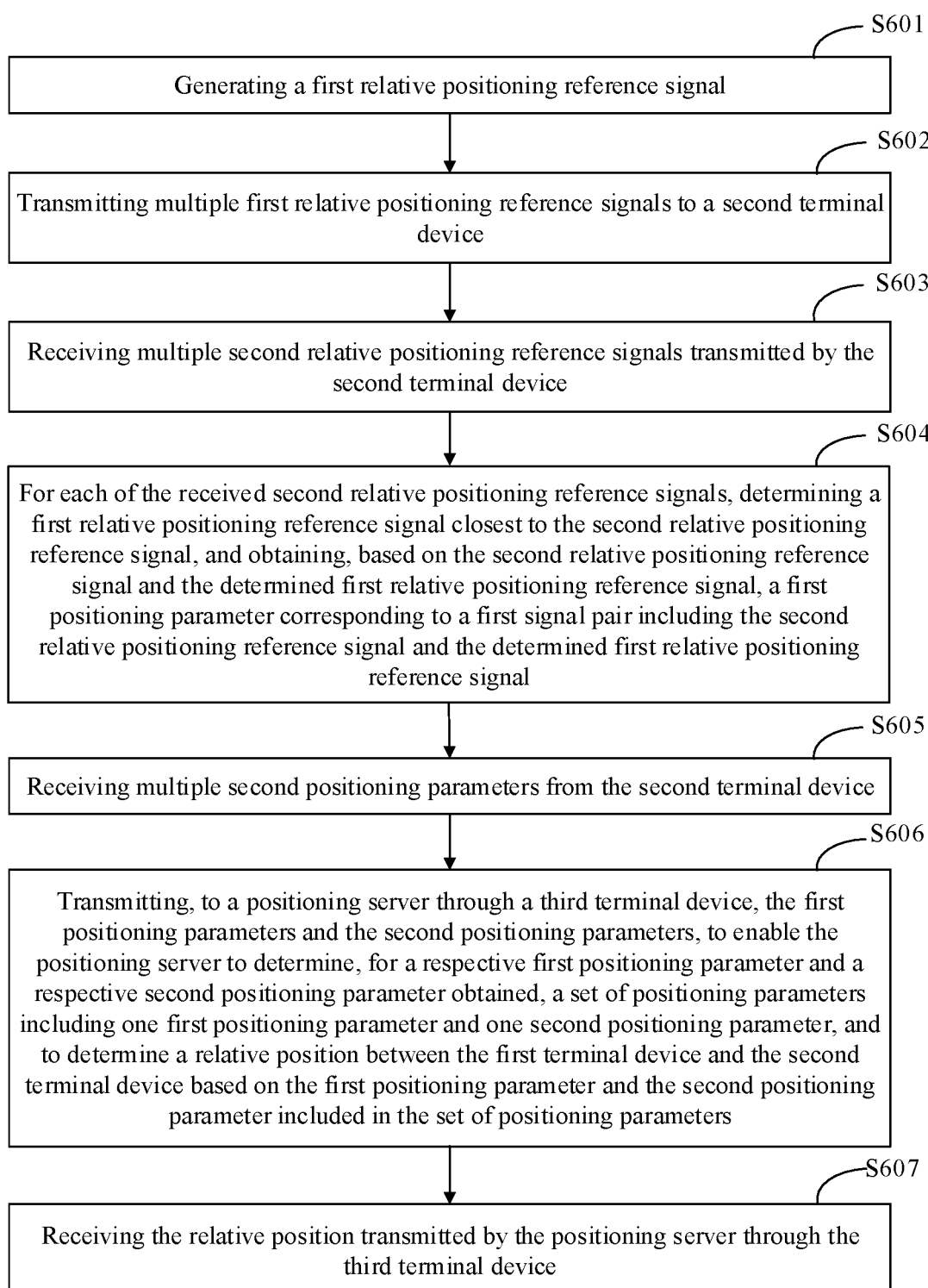

S601

Generating a first relative positioning reference signal

S602

Transmitting multiple first relative positioning reference signals to a second terminal device

S603

Receiving multiple second relative positioning reference signals transmitted by the second terminal device

S604

For each of the received second relative positioning reference signals, determining a first relative positioning reference signal closest to the second relative positioning reference signal, and obtaining, based on the second relative positioning reference signal and the determined first relative positioning reference signal, a first positioning parameter corresponding to a first signal pair including the second relative positioning reference signal and the determined first relative positioning reference signal

S605

Receiving multiple second positioning parameters from the second terminal device

S606

Transmitting, to a positioning server through a third terminal device, the first positioning parameters and the second positioning parameters, to enable the positioning server to determine, for a respective first positioning parameter and a respective second positioning parameter obtained, a set of positioning parameters including one first positioning parameter and one second positioning parameter, and to determine a relative position between the first terminal device and the second terminal device based on the first positioning parameter and the second positioning parameter included in the set of positioning parameters

S607

Receiving the relative position transmitted by the positioning server through the third terminal device

Obtaining a first positioning parameter and a second positioning parameter

S702

Determining, based on the first positioning parameter and the second positioning parameter, a relative position between the first terminal device and the second terminal device 820 Memory 800 Transceiver Bus 810 Processor

RELATIVE POSITIONING METHOD AND APPARATUS, AND READABLE STORAGE MEDIUM

CROSS-REFERENCE TO RELATED APPLICATION

The present application is a National stage of International Application No. PCT/CN2022/082099, which claims priority to Chinese Patent Application No. 202110328328.6, entitled "RELATIVE POSITIONING METHOD AND APPARATUS, AND READABLE STORAGE MEDIUM", filed with the China National Intellectual Property Administration on Mar. 26, 2021, both of which are hereby incorporated by reference in their entireties.

TECHNICAL FIELD

The present application relates to the field of communication technologies and, in particular, to a relative positioning method and apparatus, and a readable storage medium.

BACKGROUND

With the development of the communication technology, rapid progress has been achieved on the Internet of Vehicles technology. In the Internet of Vehicles technology, it is necessary to obtain relative position information between terminal devices with high precision and high reliability to determine relative position information between the vehicle and any object, to achieve effective control of the vehicles and provide comprehensive service.

In the prior art, there are two methods for determining the relative position information between terminal devices. The first method is to first determine an absolute position of each terminal device, and then calculate the relative position between the terminal devices. The second method is to adopt the relative positioning technology based on wireless short distance communication.

Hence, in the prior art, it is necessary to first determine the absolute positions of the terminal devices before calculating the relative position therebetween according to the first positioning method. Compared to direct calculation of the relative position, the computational complexity greatly increases, resulting in lower positioning efficiency for the relative position and significantly increased positioning delay. However, there is a relatively large error in a positioning parameter determined during relative positioning by using the second positioning method, resulting in lower accuracy of relative positioning.

SUMMARY

The present application provides a relative positioning method and apparatus, and a readable storage medium for solving a problem as follows: in the prior art, it is necessary to first determine absolute positions of the terminal devices before calculating the relative position therebetween according to the first positioning method, the computational complexity greatly increases, resulting in lower positioning efficiency for the relative position and significantly increased positioning delay; and there is a relatively large error in a positioning parameter determined during relative positioning by using the second positioning method, resulting in lower accuracy of relative positioning.

In one embodiment of the present application provides a relative positioning method applied to a first terminal device, the first terminal device is connected to a second terminal device through a direct communication link, and the method includes:

transmitting a first relative positioning reference signal to the second terminal device, and receiving a second relative positioning reference signal transmitted by the second terminal device;

determining a first positioning parameter corresponding to the received second relative positioning reference signal and the first relative positioning reference signal;

receiving a second positioning parameter transmitted by the second terminal device, where the second positioning parameter is determined by the second terminal based on the received first relative positioning reference signal and the second relative positioning reference signal;

determining, based on the first positioning parameter and the second positioning parameter, a relative position between the first terminal device and the second terminal device.

In one embodiment of the present application provides a relative positioning method applied to a positioning server, where a first terminal device and a second terminal device are connected through a direct communication link, and the method includes:

obtaining a first positioning parameter and a second positioning parameter, where the first positioning parameter is a positioning parameter corresponding to a second relative positioning reference signal and a first relative positioning reference signal determined by the first terminal device, and the second positioning parameter is a positioning parameter corresponding to the first relative positioning reference signal and the second relative positioning reference signal determined by the second terminal device, the first relative positioning reference signal is transmitted by the first terminal device to the second terminal device, and the second relative positioning reference signal is received by the first terminal device and transmitted by the second terminal device;

determining, based on the first positioning parameter and the second positioning parameter, a relative position between the first terminal device and the second terminal device.

In one embodiment of the present application provides a relative positioning apparatus located in a first terminal device, where the first terminal device is connected to a second terminal device through a direct communication link, and the apparatus includes:

a memory, a transceiver, a processor:

where the memory is configured to store a computer program; the transceiver is configured to transmit and receive data under control of the processor; and the processor is configured to read the computer program in the memory and perform following operations:

transmitting a first relative positioning reference signal to the second terminal device, and receiving a second relative positioning reference signal transmitted by the second terminal device;

determining a first positioning parameter corresponding to the received second relative positioning reference signal and the first relative positioning reference signal;

receiving a second positioning parameter transmitted by the second terminal device, and the second positioning parameter is determined by the second terminal based on the received first relative positioning reference signal and the second relative positioning reference signal;

determining, based on the first positioning parameter and the second positioning parameter, a relative position between the first terminal device and the second terminal device.

In one embodiment of the present application provides a relative positioning apparatus located in a positioning server, where a first terminal device and a second terminal device are connected through a direct communication link, and the apparatus includes:

a memory, a transceiver, a processor:

where the memory is configured to store a computer program; the transceiver is configured to transmit and receive data under control of the processor; and the processor is configured to read the computer program in the memory and perform following operations:

obtaining a first positioning parameter and a second positioning parameter, where the first positioning parameter is a positioning parameter corresponding to a second relative positioning reference signal and a first relative positioning reference signal determined by the first terminal device, and the second positioning parameter is a positioning parameter corresponding to the first relative positioning reference signal and the second relative positioning reference signal determined by the second terminal device, the first relative positioning reference signal is transmitted by the first terminal device to the second terminal device, and the second relative positioning reference signal is received by the first terminal device and transmitted by the second terminal device;

determining, based on the first positioning parameter and the second positioning parameter, a relative position between the first terminal device and the second terminal device.

In one embodiment of the present application provides a relative positioning apparatus located in a first terminal device, and the first terminal device is connected to a second terminal device through a direct communication link, where the apparatus includes:

a transmitting unit, configured to transmit a first relative positioning reference signal to the second terminal device;

a receiving unit, configured to receive a second relative positioning reference signal transmitted by the second terminal device;

a determining unit, configured to determine a first positioning parameter corresponding to the received second relative positioning reference signal and the first relative positioning reference signal;

the receiving unit is further configured to receive a second positioning parameter transmitted by the second terminal device, where the second positioning parameter is determined by the second terminal based on the received first relative positioning reference signal and the second relative positioning reference signal;

the determining unit is further configured to determine, based on the first positioning parameter and the second positioning parameter, a relative position between the first terminal device and the second terminal device.

In one embodiment of the present application provides a relative positioning apparatus located in a positioning server, where a first terminal device and a second terminal device are connected through a direct communication link, where the apparatus includes:

an obtaining unit, configured to obtain a first positioning parameter and a second positioning parameter, where the first positioning parameter is a positioning parameter corresponding to a second relative positioning reference signal and a first relative positioning reference signal determined by the first terminal device, and the second positioning parameter is a positioning parameter corresponding to the first relative positioning reference signal and the second relative positioning reference signal determined by the second terminal device, the first relative positioning reference signal is transmitted by the first terminal device to the second terminal device, and the second relative positioning reference signal is received by the first terminal device and transmitted by the second terminal device;

a determining unit, configured to determine a relative position between the first terminal device and the second terminal device based on the first positioning parameter and the second positioning parameter.

In one embodiment of the present application provides a processor-readable storage medium storing a computer program, where the computer program is configured to enable a processor to perform the method described in the first or the second aspect.

In one embodiment of the present application provides a computer program product including a computer program, where when the computer program is executed by a processor, the method as described in the first aspect or the second aspect is implemented.

In one embodiment of the present application provides a computer program, where when the computer program is executed by a processor, the method as described in the embodiments are implemented.

The present application provides a relative positioning method and apparatus, and a readable storage medium applied to a first terminal device, the first terminal device is connected to a second terminal device through a direct communication link, by transmitting a first relative positioning reference signal to the second terminal device, and receiving a second relative positioning reference signal transmitted by the second terminal device; determining a first positioning parameter corresponding to the received second relative positioning reference signal and the first relative positioning reference signal; receiving a second positioning parameter transmitted by the second terminal device, where the second positioning parameter is determined by the second terminal based on the received first relative positioning reference signal and the second relative positioning reference signal; and determining, based on the first positioning parameter and the second positioning parameter, a relative position between the first terminal device and the second terminal device, since when performing relative positioning between terminal devices, both of the first positioning parameter and the second positioning parameter are determined by relative positioning reference signals travelling back and forth between the first and second terminal devices, thus the first positioning parameter and the second positioning parameter are parameters whose errors have been weakened, and then the relative position determined based on the first positioning parameter and the second positioning parameter is more accurate. Furthermore, the relative position between the terminal devices can be determined without determining an absolute position of each of the terminal devices, thus reducing the computational cost, greatly reducing positioning delay, and improving positioning efficiency.

It should be understood that the content described in the summary is not intended to limit a key or important feature of the embodiments of the present application, nor is it intended to limit the scope of the present application. Other features of the present application will be easily understood through the following description.

BRIEF DESCRIPTION OF THE DRAWINGS

FIG. 4 is a flowchart of a relative positioning method provided in an embodiment of the present application.

FIG. 6 is a flowchart of a relative positioning method provided in another embodiment of the present application.

FIG. 7 is a flowchart of a relative positioning method provided in yet another embodiment of the present application.

FIG. 8 is a flowchart of a relative positioning method provided in yet another embodiment of the present application.

FIG. 9 is a flowchart of a relative positioning method provided in yet another embodiment of the present application.

FIG. 10 is a flowchart of a relative positioning method provided in yet another embodiment of the present application.

DESCRIPTION OF EMBODIMENTS

The term "multiple" in embodiments of the present application refers to two or more, and other quantifiers are similar.

In order to clearly understand the embodiment of the present application, a detailed introduction to a solution of the prior art is provided firstly.

In the prior art, the determination of a relative position between terminal devices is applied in multiple fields. Exemplarily, in the field of the Internet of Vehicles technology, relative position information between terminal devices with high precision and high reliability is determined, and to determine relative position information between a vehicle with the terminal device and any object, thus achieving effective control of the vehicle and providing comprehensive service.

In the prior art, there are two methods for determining the relative position information between terminal devices. The first method is to first determine an absolute position of each terminal device, and then calculate the relative position between the terminal devices. The second method is to adopt the relative positioning technology based on wireless short distance communication.

Figure 1:
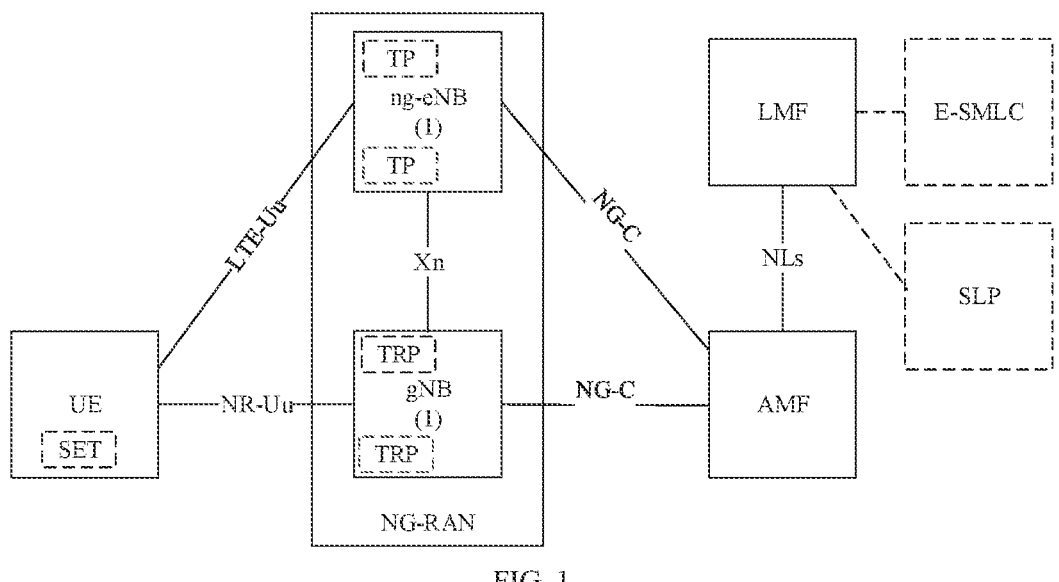
FIG. 1 is a network architecture diagram of a positioning method based on a cellular network in the prior art.
Figure 2:
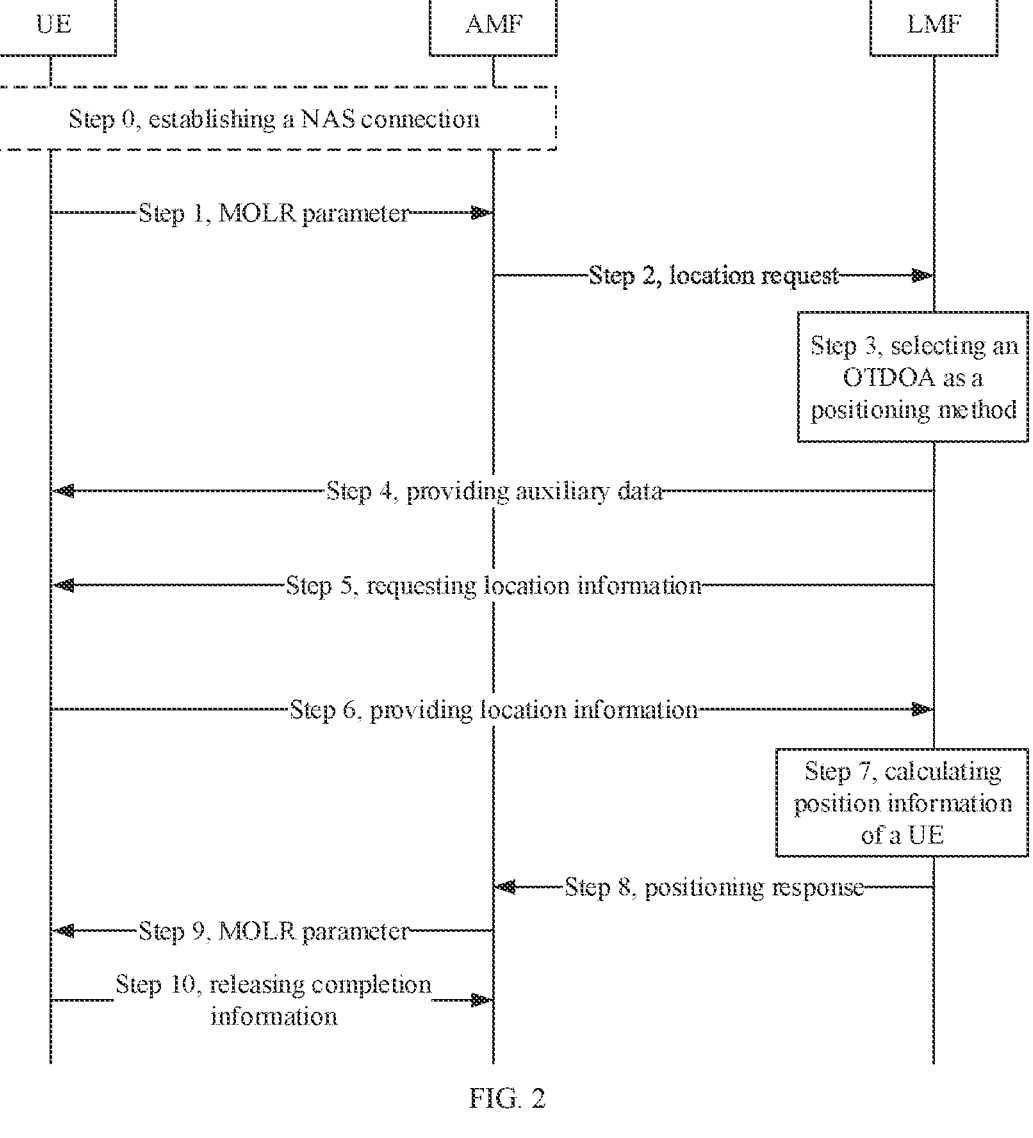
FIG. 2 is a signaling interaction flowchart for absolute positioning taking a position request triggered by a terminal device as an example in the prior art.

FIG. 1 is a network architecture diagram of a positioning method based on a cellular network in the prior art. As shown in FIG. 1, in the first method, it is required for a terminal device (abbreviated as UE), a network side device: an NG-RAN, a core network device: an access and mobility management function (abbreviated as AMF) entity and/or a location management function (abbreviated as LMF, also known as positioning/location server) entity. Taking a method in which a positioning request is triggered by a terminal device and an observed time difference of arrival is used for absolute positioning as an example to illustrate. As shown in FIG. 2, the positioning method includes the following steps.

Step 0, UE establishes a non-access stratum (NAS) connection with an access and mobility management function (abbreviated as AMF) entity.

Step 1, the UE transmits a Mobile Originated Location Request (MOLR) parameter to the AMF.

Step 2, the AMF transmits a location request to a location management function (abbreviated as LMF, also known as location server) entity.

Step 3, the LMF selects an observed time difference of arrival (abbreviated as OTDOA) as a positioning method.

Step 4, the LMF provides auxiliary data to the UE.

Step 5, the LMF requests location information from the UE.

Step 6, the UE provides location information.

Step 7, the LMF calculates location information of the UE.

Among them, the location information of UE is absolute location information.

Step 8, the LMF transmits a positioning response to the AMF.

Step 9, the AMF transmits an MOLR parameter to the UE.

Step 10, the UE releases completion information to the AMF.

According to the method for positioning a terminal device shown in FIG. 2, when performing absolute positioning for a terminal device, it is necessary for the terminal device to interact with a core network device multiple times through a network side device to achieve absolute positioning for the terminal device. After determining an absolute position of the terminal device, the core network device calculates a relative position of two terminal devices based on their absolute positions. Therefore, although the relative position between terminal devices can be determined through such relative positioning method, the computational cost greatly increases. Moreover, it is necessary to first obtain accurate geographic location information of the network side device participating in positioning, which leads to low positioning efficiency and greatly increases positioning delay.

In the second method, when adapting the relative positioning technology based on wireless short distance communication, relative positioning between terminal devices is performed mainly by determining parameters, such as, a received signal strength indicator (abbreviated as RSSI), a time of arrival (abbreviated as TOA), a time difference of arrival (abbreviated as TDOA), an angle of arrival (abbreviated as AOA) and frequency difference of arrival (abbreviated as FDOA) and etc. For example, a positioning principle using time of arrival is to determine a relative position between terminal devices by measuring a signal transmission time after determining a specific positioning source. For another example, a received signal strength value, i.e., a road loss, is used for determining a relative position between terminal devices using Bluetooth-based relative positioning technology.

In such relative positioning method for a terminal device, the accuracy of positioning is low due to the introduction of significant errors in determining the above parameters. In the field of the Internet of Vehicles technology, under scenarios with cellular network coverage, 99% stability is required, and the relative positioning accuracy can meet a requirement of a horizontal relative positioning accuracy of 0.1 m and a vertical relative positioning accuracy of 0.5 m. For example, a relative position of this vehicle with a pedestrian on the roadside, a relative position with a road-side unit, and a relative position with adjacent vehicles. However, such relative positioning method is far from meeting such high-precision requirement. It cannot meet a positioning business requirement based on a quality of service (abbreviated as QoS) indicator requirement in scenarios with cellular network coverage.

Therefore, based on the technical problems in the prior art, the inventors found through creative research that in the scenario of cellular network coverage, terminal devices may communicate directly with each other. That is, adjacent terminal devices communicate through a direct communication link (also known as Sidelink) within a close range to complete data transmission. A wireless interface corresponding to the Sidelink is called a direct communication interface (abbreviated as SL interface). So using direct communication between terminal devices, a first terminal device and a second terminal device may transmit relative positioning reference signals to each other. Exemplarily, the first terminal device transmits a first relative positioning reference signal to the second terminal device and receives a second relative positioning reference signal transmitted by the second terminal device. The first terminal device determines a first positioning parameter corresponding to the received second relative positioning reference signal and the first relative positioning reference signal. The second terminal device determines a second positioning parameter based on the received first relative positioning reference signal and the second relative positioning reference signal, and transmits the second positioning parameter to the first terminal device. The first terminal device determines a relative position between the first terminal device and the second terminal device based on the first positioning parameter and the second positioning parameter. When performing relative positioning between terminal devices, both of the first positioning parameter and the second positioning parameter are determined by the relative positioning reference signals that travel back and forth between the first and second terminal devices, thus the first positioning parameter and the second positioning parameter are parameters for which errors have been minimized as much as possible, and then the relative position determined based on the first positioning parameter and the second positioning parameter is more accurate. Furthermore, the relative position between the terminal devices can be determined without determining an absolute position of each of the terminal devices, thus reducing the computational cost, greatly reducing positioning delay, and improving positioning efficiency.

Figure 3:
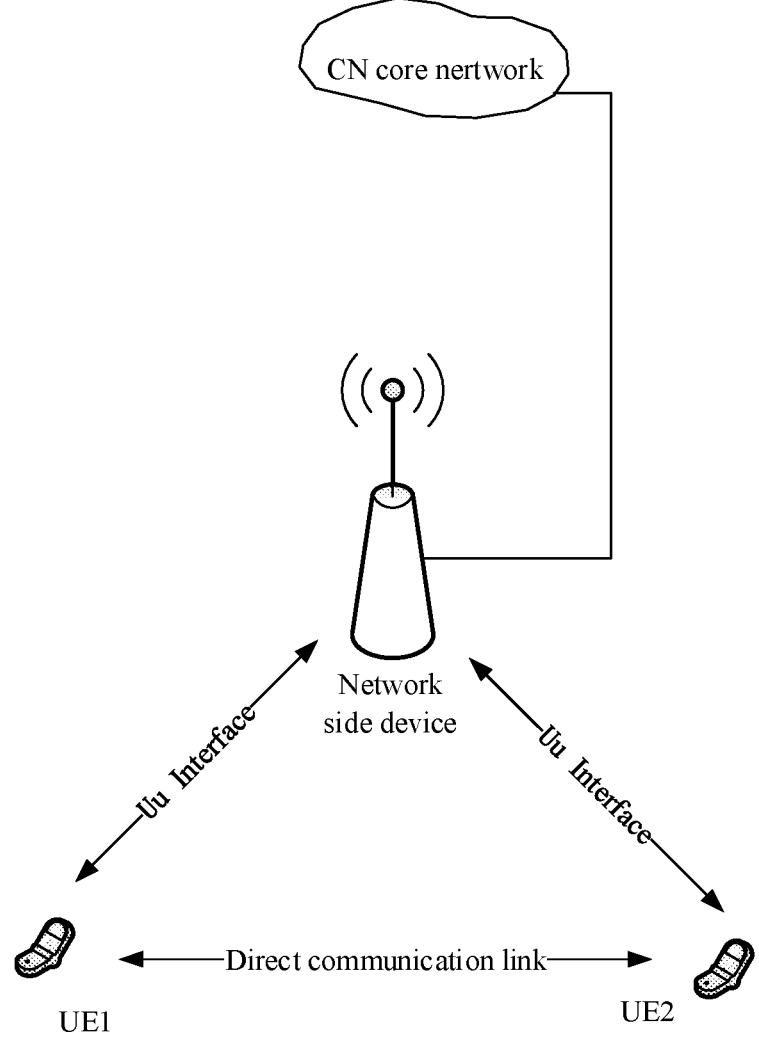
FIG. 3 is a network architecture diagram for a relative positioning method provided in an embodiment of the present application.

FIG. 3 is a network architecture diagram for a relative positioning method provided in an embodiment of the present application. As shown in FIG. 3, in the network architecture for the relative positioning method provided in an embodiment of the present application, terminal devices communicate with each other through a Sidelink. The terminal device communicates with a network side device through a Uu interface, and the network side device is connected with a core network device in a CN core network in a communicative manner. The core network device includes: LMF, also known as positioning server.

In FIG. 3, two terminal devices, UE1 and UE2, are included as an example. But other terminal devices which communicate with UE1 and/or UE2 through direct communication links can also be included. The network architecture of the relative positioning method provided in the embodiment of the present application is under coverage of a cellular network. The terminal device that communicates through the direct communication link may be either an on-network terminal or an off-network terminal.

The embodiment provided in the embodiments of the present application may be applied to various systems with cellular network coverage, especially a 5G system. For example, the applicable systems may be a global system of mobile communication (GSM) system, a code division multiple access (CDMA) system, a wideband code division multiple access (WCDMA), a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 5G new radio NR) system, etc. These systems include a terminal device, a network device and a core network part, such as an evolved packet system (EPS), a 5G system (5GS), etc.

The terminal device involved in the embodiments of the present application may be a device that provides voice and/or data connectivity to a user, a handheld device with wireless connection functions, or other processing device connected to a wireless modem. In different systems, the names of the terminal device may also be different. For example, in a 5G system, the terminal device may be called as a user equipment (UE). The wireless terminal device may communicate with one or more core networks (CN) through a radio access network (RAN). The wireless terminal device may be a mobile terminal device, such as, a mobile phone (or a "cellular" phone) and a computer with a mobile terminal device, such as a portable, pocket, handheld, built-in or vehicle-mounted mobile apparatus, which exchanges language and/or data with the wireless access network. For example, a personal communication service (PCS) telephone, a cordless telephone, a session initiation protocol (SIP) telephone, a wireless local loop (WLL) station, a personal digital assistant (PDA) and other devices. Terminal devices may also have direct communication functions between them, such as a communication terminal device in the Internet of Vehicles or other direct terminal devices. The wireless terminal device may also be referred to as a system, a subscriber unit, a subscriber station, a mobile station, a mobile, a remote station, an access point, a remote terminal, an access terminal, a user terminal, a user agent, a user device, which is not limited in the embodiments of the present application.

The network side device involved in the embodiments of the present application may be a base station, which may include multiple cells providing services for a terminal device. Depending on the specific application scenario, the base station may also be referred to as an access point, a device in the access network that communicates with a wireless terminal device through one or more sectors on the air interface, or other names. The network device may be configured to exchange a received air frame with an Internet protocol (IP) packet, worked as a router between the wireless terminal device and the rest of the access network, where the rest of the access network may include an Internet protocol (IP) communication network. The network device may further coordinate an attribute management of an air interface. For example, the network device involved in the embodiments of the present application may be a network device (Base Transceiver Station, BTS) in a global system for mobile communications (GSM) or a code division multiple access (CDMA), or a network device (NodeB) in wideband code division multiple access (WCDMA), an evolutional node B (eNB or e-NodeB) in a long term evolution (LTE) system, a 5G base station (gNB) in a 5G network architecture (next generation system), or a home evolved node B (HeNB), a relay node, a femtocell, a picocell (pico), etc., which is not limited in the embodiments of the present application. In some network structures, the network device may include a centralized unit (CU) node and a distributed unit (DU) node, and the centralized unit and the distributed unit may also be geographically separated.

The network side device and the terminal device involved in the embodiments of the present application may use one or more antennas for multi input multi output (MIMO) transmission, which may be a single user MIMO (SU-MIMO) or a multiple user MIMO (MU-MIMO). According to a shape and a number of root antenna combinations, the MIMO transmission may be a 2D-MIMO, a 3D-MIMO, an FD-MIMO, or a massive MIMO, as well as a diversity transmission, a pre-coding transmission, a beam forming transmission, etc.

The embodiments of the present application may be applied in an application scenario of the Internet of Vehicles. The terminal device may be a vehicle mounted terminal in a vehicle, a user terminal carried by a pedestrian on the roadside, or a roadside unit. By using the relative positioning method provided in the embodiments of the present application, a relative position between the vehicle and the pedestrian on the roadside, a relative position between the vehicle and the roadside unit, and a relative position between adjacent vehicles can be determined with high accuracy.

In the following, a clear and complete description of the embodiment in the embodiments of the present application will be given in combination with the drawings in the embodiments of the present application. Apparently, the described embodiments are merely a part rather than all embodiments of the present application.

FIG. 4 is a flowchart of a relative positioning method provided in an embodiment of the present application. As shown in FIG. 4, an execution subject body of the relative positioning method provided in an embodiment of the present application is a relative positioning apparatus. The relative positioning apparatus is located in a first terminal device. The first terminal device is connected to a second terminal device through a direct communication link. The relative positioning method provided in an embodiment of the present application includes the following steps.

Step 101, transmitting a first relative positioning reference signal to the second terminal device, and receiving a second relative positioning reference signal transmitted by the second terminal device.

Among them, the first terminal device may be a terminal device applying for relative positioning, and the second terminal device may be a counterpart terminal device participating in the relative positioning. In one embodiment, the second terminal device is a terminal device applying for relative positioning, and the first terminal device is a counterpart terminal device participating in the relative positioning.

In an embodiment provided in the present application, if the first terminal device is a terminal device applying for relative positioning, the first terminal device may transmit a relative positioning request to a network side device. The network side device configures a relative positioning reference signal based on the relative positioning request, generates configuration information for a relative positioning reference signal, and transmits the configuration information for the relative positioning reference signal to the first terminal device and the second terminal device, enabling the first terminal device and second terminal device to generate corresponding relative positioning reference signals. The relative positioning reference signal generated by the first terminal device is the first relative positioning reference signal. The relative positioning reference signal generated by the second terminal device is the second relative positioning reference signal.

It should be understood that the first relative positioning reference signal and the second relative positioning reference signal may also be generated through other manners, which is not limited in the embodiments provided of the present application.

The forms of the first relative positioning reference signal and the second relative positioning reference signal are not limited in an embodiment provided in the present application.

In an embodiment provided in the present application, pre-authorized spectrum resource information is stored in the first terminal device and the second terminal device in advance. When the first terminal device transmits the first relative positioning reference signal to the second terminal device, the first terminal device transmits the first relative positioning reference signal based on the spectrum resource information. Similarly, when the second terminal device transmits the second relative positioning reference signal to the first terminal device, the second terminal device transmits the second relative positioning reference signal based on the spectrum resource information.

It should be noted that when transmitting the first relative positioning reference signal to the second terminal device, the first terminal device transmits the first relative positioning reference signal to the second terminal device through an SL interface of a Sidelink, and receives the second relative positioning reference signal transmitted by the second terminal device through the SL interface of the Sidelink.

Step 102, determining a first positioning parameter corresponding to the received second relative positioning reference signal and the first relative positioning reference signal.

In an embodiment provided in the present application, the second relative positioning reference signal received by the first terminal device and the first relative positioning reference signal transmitted by the first terminal device may form a signal pair, and a positioning parameter corresponding to the signal pair is the first positioning parameter. The first positioning parameter may include: a first time difference, a first timestamp, a first direction angle measurement parameter, and a first power aperture related parameter, as well as other parameters, which are not limited in an embodiment provided in the present application.

Among them, the first time difference is a time difference between a receiving time of the second relative positioning reference signal and a transmitting time of the first relative positioning reference signal in the signal pair. The first timestamp is a moment at which the first time difference is determined. The first timestamp may be expressed in universal coordinated absolute time UTC or cellular time. If cellular time is used for expressing, the cellular time is expressed by a system frame number (abbreviated as sfn), a slot number (abbreviated as slot), and a symbol number.

Among them, the first direction angle measurement parameter includes: a first receiving antenna direction angle and a first transmitting antenna direction angle. The first receiving antenna direction angle is a direction angle of an antenna corresponding to the received second relative positioning reference signal. The first transmitting antenna direction angle is a direction angle of an antenna corresponding to transmission of the first relative positioning reference signal.

Among them, the first power aperture related parameter includes: a first received power, a first multipath received power, a first NLOS path, and a first LOS path. The first received power is a received power for receiving the second relative positioning reference signal. The first multipath received power is a multipath received power corresponding to reception of the second relative positioning reference signal by the first terminal device. The first NLOS path is an NLOS path corresponding to the first terminal device. The first LOS path is an LOS path corresponding to the first terminal device.

Step 103, receiving a second positioning parameter transmitted by the second terminal device, where the second positioning parameter is determined by the second terminal based on the received first relative positioning reference signal and the second relative positioning reference signal.

In an embodiment provided in the present application, the second terminal device receives the first relative positioning reference signal and transmits the second relative positioning reference signal to the first terminal device. The second terminal device forms the received first relative positioning reference signal and the transmitted second relative positioning reference signal into a signal pair, and determines a second positioning parameter corresponding to the signal pair.

Among them, the second positioning parameter includes: a second time difference, a second timestamp, a second direction angle measurement parameter, and a second power aperture related parameter corresponding to the signal pair. Other parameters may also be included, which are not limited in an embodiment provided in the present application.

Among them, the second time difference is a time difference between a receiving time of the first relative positioning reference signal and a transmitting time of the second relative positioning reference signal in the signal pair. The second timestamp is a moment at which the second time difference is determined. The second timestamp may be expressed in universal coordinated absolute time UTC or cellular time. If cellular time is used for expressing, the cellular time is expressed by a system frame number (abbreviated as sfn), a slot number (abbreviated as slot), and a symbol number.

The second direction angle measurement parameter includes: a second receiving antenna direction angle and a second transmitting antenna direction angle. The second receiving antenna direction angle is a direction angle of an antenna corresponding to the first relative positioning reference signal received by the second terminal. The second transmitting antenna direction angle is a direction angle of an antenna corresponding to transmission of the second relative positioning reference signal by the second terminal.

Among them, the second power aperture related parameter includes: a second received power, a second multipath received power, a second NLOS path, and a second LOS path. The second received power is a received power for receiving the first relative positioning reference signal by the second terminal device. The second multipath received power is a multipath received power corresponding to reception of the first relative positioning reference signal by the second terminal device. The second NLOS path is an NLOS path corresponding to the second terminal device. The second LOS path is a LOS path corresponding to the second terminal device.

In an embodiment provided in the present application, after the second terminal device determines the second positioning parameter and transmits the second positioning parameter to the first terminal device through the SL interface of the Sidelink, the first terminal device receives the second positioning parameter.

Step 104, determining, based on the first positioning parameter and the second positioning parameter, a relative position between the first terminal device and the second terminal device.

In an embodiment provided in the present application, a relative distance and a relative angle between two terminal devices are determined based on the first positioning parameter and the second positioning parameter. The relative position between the first terminal device and the second terminal device is composed of the relative distance and the relative angle.

Figure 5:
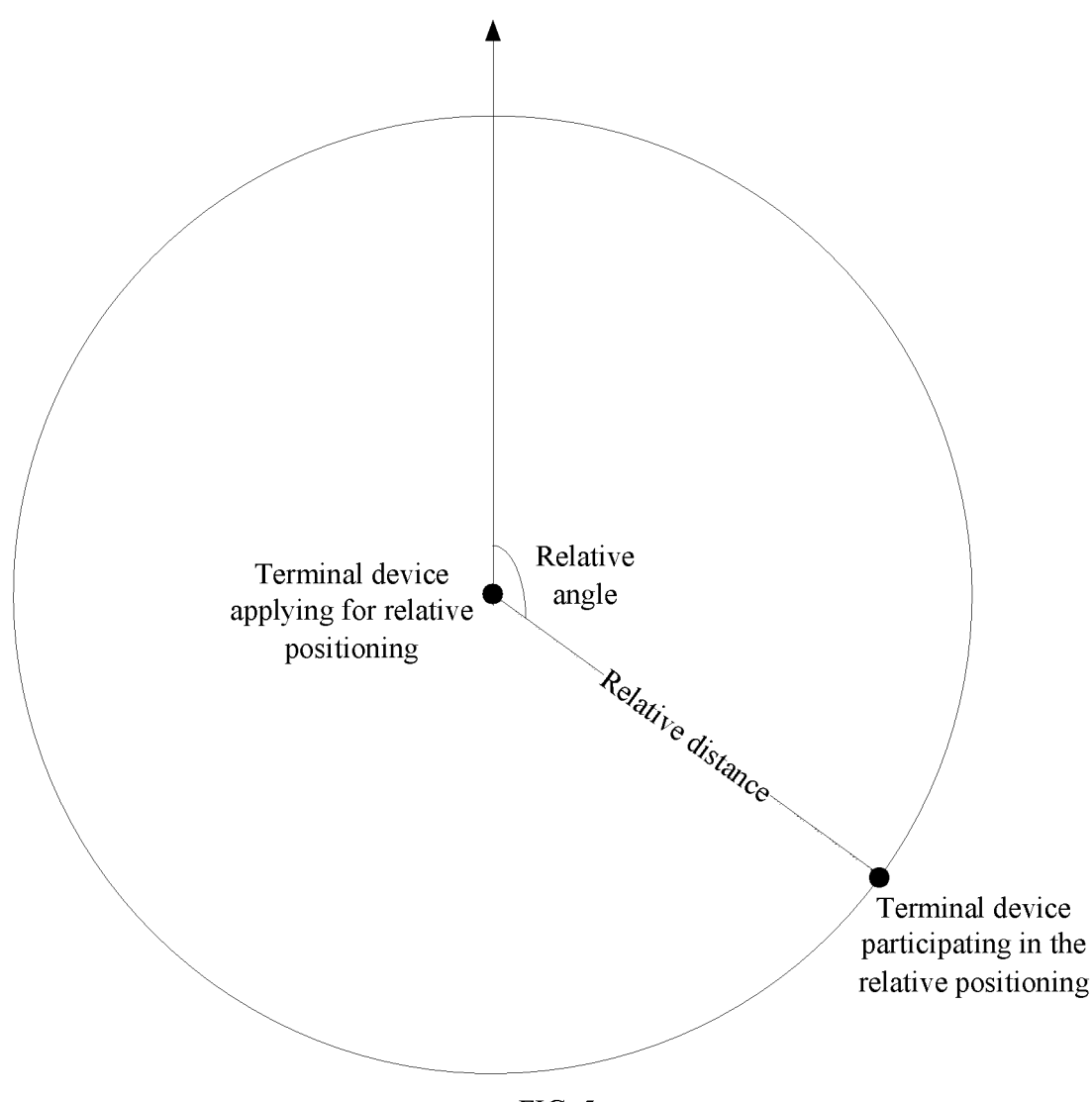
FIG. 5 is a schematic diagram of a relative position between terminal devices in an embodiment of the present application.

As shown in FIG. 5, the relative distance is a relative distance between a terminal device applying for relative positioning and a counterpart terminal device participating in relative positioning. The relative angle is an angle of counterclockwise rotation from a north direction to a position of the counterpart terminal device participating in the relative positioning by taking the terminal device applying for the relative positioning as a center of a circle.

In an embodiment provided in the present application, if the first terminal device is the terminal device applying for relative positioning, and the second terminal device is the terminal device participating in the relative positioning, the relative angle is an angle of counterclockwise rotation from a north direction to a position of the second terminal device by taking the first terminal device as a center of a circle. If the first terminal device is the terminal device participating in relative positioning, and the second terminal device is the terminal device applying for the relative positioning, the relative angle is the angle of counterclockwise rotation from the north direction to a position of the first terminal device by taking the second terminal device as a center of a circle.

The relative positioning method in an embodiment provided in the present application is applied to a first terminal device, where the first terminal device is connected to a second terminal device through a direct communication link, by transmitting a first relative positioning reference signal to the second terminal device, and receiving a second relative positioning reference signal transmitted by the second terminal device; determining a first positioning parameter corresponding to the received second relative positioning reference signal and the first relative positioning reference signal; receiving a second positioning parameter transmitted by the second terminal device, where the second positioning parameter is determined by the second terminal based on the received first relative positioning reference signal and the second relative positioning reference signal; determining, based on the first positioning parameter and the second positioning parameter, a relative position between the first terminal device and the second terminal device. When performing relative positioning between terminal devices, both of the first positioning parameter and the second positioning parameter are determined by the relative positioning reference signals transmitted between the first and second terminal devices, thus the first positioning parameter and the second positioning parameter are parameters whose errors have been weakened, and then the relative position determined based on the first positioning parameter and the second positioning parameter is more accurate. Furthermore, the relative position between the terminal devices can be determined without determining an absolute position of each of the terminal devices, thus reducing the computational cost, greatly reducing positioning delay, and improving positioning efficiency.

Embodiment II

FIG. 6 is a flowchart of a relative positioning method provided in another embodiment of the present application. As shown in FIG. 6, based on the relative positioning method provided in Embodiment I of the present application, an embodiment of the present application is an embodiment under the situation that there are multiple first relative positioning reference signals and multiple second relative positioning reference signals. Among them, the first terminal device is a terminal applying for relative positioning, the first terminal device may be either an on-network device or an off-network device. The embodiment of the present application included the following steps.

Step 201, generating a first relative positioning reference signal.

In one embodiment, step 201 includes the following steps.

Step 2011, transmitting a relative positioning request to a network side device.

Among them, the relative positioning request is used for instructing the network side device to transmit configuration information for a relative positioning reference signal to the first terminal device and second terminal device.

In an embodiment provided in the present application, when the first terminal device has a demand to determine a relative position between itself and the second terminal device, a relative positioning request is transmitted to the network side device.

Step 2012, receiving the configuration information for the relative positioning reference signal transmitted by the network side device.

In an embodiment provided in the present application, the network side device determines the configuration information for the relative positioning reference signal between the first terminal device and second terminal device based on the relative positioning request, and transmits the configuration information for the relative positioning reference signal to the first terminal device and the second terminal device through Uu interfaces. So the first terminal device receives the configuration information for the relative positioning reference signal transmitted by the network side device. Correspondingly, the second terminal device also receives the configuration information for the relative positioning reference signal transmitted by the network side device.

Among them, the configuration information for the relative positioning reference signal includes any of the following parameters or combinations:

a transmitted signal power for relative positioning, a frequency point, a bandwidth, a periodic signal or a semi persistent signal (including a duration), an activation moment of a reference signal, a carrier aggregation frequency point and a measurement moment.

Step 2013, generating the first relative positioning reference signal based on the configuration information for the relative positioning reference signal.

In an embodiment provided in the present application, the first terminal device generates, based on the configuration information for the relative positioning reference signal, a relative positioning reference signal that meets a requirement of the configuration information, and the relative positioning reference signal generated by the first terminal device is the first relative positioning reference signal.

It should be noted that the second terminal device generates, based on configuration information for a relative positioning reference signal, a relative positioning reference signal that meets a requirement of the configuration information, and the relative positioning reference signal generated by the second terminal device is the second relative positioning reference signal.

Step 202, transmitting multiple first relative positioning reference signals to the second terminal device.

In another embodiment provided in the present application, step 202 includes the following steps.

Step 2021, obtaining pre-authorized spectrum resource information.

Step 2022, transmitting, based on the spectrum resource information, the first relative positioning reference signal.

In an embodiment provided in the present application, the pre-authorized spectrum resource information is stored in each terminal device in advance. For the terminal device applying for relative positioning and the counterpart terminal device participating in the relative positioning, the spectrum resource information is consistent, and the terminal device applying for relative positioning and the counterpart terminal device participating in the relative positioning may transmit corresponding relative positioning reference signals based on the spectrum resource information.

Therefore, in an embodiment provided in the present application, the first terminal device transmits the first relative positioning reference signal through the SL interface based on the pre-authorized spectrum resource information, and the second terminal device transmits the second relative positioning reference signal through the SL interface based on the pre-authorized spectrum resource information.

Step 203, receiving multiple second relative positioning reference signals transmitted by the second terminal device.

In an embodiment provided in the present application, step 202 and step 203 can be combined for explanation. After generating the first relative positioning reference signal, the first terminal device may periodically or in real-time transmit the first relative positioning reference signal to the second terminal device through the SL interface of the Sidelink. After generating the second relative positioning reference signal, the second terminal device may periodically or in real-time transmit the second relative positioning reference signal to the first terminal device through the SL interface of the Sidelink. In this way, the first terminal device may receive multiple second relative positioning reference signals transmitted by the second terminal device.

It should be noted that a period for transmitting the first relative positioning reference signal by the first terminal device to the second terminal device may be the same or different from a period for transmitting the second relative positioning reference signal by the second terminal device to the first terminal device. The periods may be determined according to actual needs.

Step 204, for each of the received second relative positioning reference signals, determining a first relative positioning reference signal closest to the second relative positioning reference signal.

Step 205, obtaining, based on the second relative positioning reference signal and the determined first relative positioning reference signal, a first positioning parameter corresponding to a first signal pair including the second relative positioning reference signal and the determined first relative positioning reference signal.

In an embodiment provided in the present application, for each of the received second relative positioning reference signals, a receiving time of the second relative positioning reference signal is determined, and a transmitting time of a respective first relative positioning reference signal is determined. According to the receiving time and the transmitting time of the first relative positioning reference signal, a first relative positioning reference signal closest to the second relative positioning reference signal in time is determined, and the second relative positioning reference signal and the determined first relative positioning reference signal are grouped to form the first signal pair. The positioning parameter corresponding to the first signal pair is determined, where the positioning parameter is called the first positioning parameter. The term "closest" here can be understood as a minimum time difference between the receiving time and the transmitting time, or a time difference between the receiving time and the transmitting time meeting a set value.

In an embodiment provided in the present application, the first positioning parameter includes: a first time difference, a first timestamp, a first direction angle measurement parameter, and a first power aperture related parameter corresponding to the first signal pair.

Among them, the first time difference is a time difference between a receiving time of the second relative positioning reference signal and a transmitting time of the closest first relative positioning reference signal in the first signal pair. The first timestamp is a moment at which the first time difference is determined. The first timestamp is expressed in universal coordinated absolute time UTC or cellular time, where the cellular time is expressed by a system frame number, a slot number, and a symbol number.

Among them, the first direction angle measurement parameter includes: a first receiving antenna direction angle and a first transmitting antenna direction angle. In one embodiment, the first receiving antenna direction angle is a direction angle of an antenna corresponding to the received second relative positioning reference signal. The first transmitting antenna direction angle is a direction angle of an antenna corresponding to transmission of the first relative positioning reference signal.

Among them, the first power aperture related parameter includes: a first received power, a first multipath received power, a first NLOS path, and a first LOS path. In one embodiment, the first received power is a received power for receiving the second relative positioning reference signal. The first multipath received power is a multipath received power corresponding to the second relative positioning reference signal received by the first terminal device. The first NLOS path is an NLOS path corresponding to the first terminal device. The first LOS path is a LOS path corresponding to the first terminal device.

In an embodiment provided in the present application, when determining the first positioning parameter corresponding to the first signal pair, parameters included in the first positioning parameter are determined separately. In one embodiment, when determining the first time difference, a time difference between a receiving time of the second relative positioning reference signal and a transmitting time of a closet first relative positioning reference signal in the first signal pair is calculated, which is the first time difference. When determining the first timestamp, a timestamp of the system is determined as the first timestamp when obtaining the first time difference. When determining the first direction angle measurement parameter, a direction angle of an antenna corresponding to the received second relative positioning reference signal is determined as the first receiving antenna direction angle. A direction angle of an antenna corresponding to transmission of the first relative positioning reference signal is determined as the first transmitting antenna direction angle. When determining the first power aperture related parameter, a received power for receiving the second relative positioning reference signal is determined as the first received power. A multipath received power corresponding to reception of the second relative positioning reference signal is the first multipath received power. An NLOS path corresponding to the first terminal device is determined as the first NLOS path. A LOS path corresponding to the first terminal device is determined as the first LOS path.

It should be noted that when multiple second relative positioning signals are received and multiple first relative positioning signals are transmitted, multiple signal pairs are determined, and a positioning parameter will be determined for each signal pair. The positioning parameters determined for different signal pairs may be the same or different.

Step 206, receiving multiple second positioning parameters transmitted by the second terminal device.

In an embodiment provided in the present application, for each of the received first relative positioning reference signals, the second terminal device determines a second relative positioning reference signal closest to the first relative positioning reference signal; and obtains a second positioning parameter corresponding to the second signal pair including the first relative positioning reference signal and the determined second relative positioning reference signal based on the first relative positioning reference signal and the determined second relative positioning reference signal.

Among them, the second positioning parameter includes: a second time difference, a second timestamp, a second direction angle measurement parameter, and a second power aperture related parameter corresponding to the second signal pair.

Among them, the second time difference is a time difference between a receiving time of the first relative positioning reference signal and a transmitting time of the closet second relative positioning reference signal in the second signal pair. The second timestamp is a moment at which the second time difference is determined. The second timestamp is expressed in universal coordinated absolute time UTC or cellular time, where the cellular time is expressed by a system frame number, a time slot number, and a symbol number.

Among them, the second direction angle measurement parameter includes: a second receiving antenna direction angle and a second transmitting antenna direction angle. In one embodiment, the second receiving antenna direction angle is a direction angle of an antenna corresponding to the first relative positioning reference signal received by the second terminal. The second transmitting antenna direction angle is a direction angle of an antenna corresponding to transmission of the second relative positioning reference signal by the second terminal.

Among them, the second power aperture related parameter includes: a second received power, a second multipath received power, and a second NLOS path. In one embodiment, the second receiving power is a received power for receiving the first relative positioning reference signal by the second terminal device. The second multipath received power is a multipath received power corresponding to reception of the first relative positioning reference signal by the second terminal device. The second NLOS path is an NLOS path corresponding to the second terminal device. The second LOS path is a LOS path corresponding to the second terminal device.

It should be noted that the way in which the second terminal device determines, for each of the received first relative positioning reference signals, a second relative positioning reference signal closest to the first relative positioning reference signal; and obtains a second positioning parameter corresponding to the second signal pair including the first relative positioning reference signal and the determined second relative positioning reference signal based on the first relative positioning reference signal and the determined second relative positioning reference signal, is similar to that in step 204 to step 205, which will not be repeated here.

Step 207, transmitting the first positioning parameters to the second terminal device, to enable the second terminal device to determine a relative position between the first terminal device and the second terminal device based on the first positioning parameters and the second positioning parameters.

In an embodiment provided in the present application, the first terminal device transmits the first positioning parameters to the second terminal device through the SL interface of the Sidelink. The second terminal device determines a set of positioning parameters based on a respective first positioning parameter and a respective second positioning parameter obtained, where the set of positioning parameters includes one first positioning parameter and one second positioning parameter; and determines the relative position between the first terminal device and the second terminal device again based on the first positioning parameter and the second positioning parameter included in the set of positioning parameters. The relative position determined by the second terminal device is used for correcting the relative position determined by the first terminal device.

Among them, the second terminal determines a set of positioning parameters based on the respective first positioning parameter and the respective second positioning parameter obtained, where the set of positioning parameters includes one first positioning parameter and one second positioning parameter; and determines the relative position between the first terminal device and the second terminal device again based on the first positioning parameter and the second positioning parameter included in the set of positioning parameters, in a way similar to that in step 208 to step 209 in the embodiments of the present application, which will not be repeated here.

It can be understood that there is no strict restriction on the sequence between step 207 and step 208.

Step 208, for a respective first positioning parameter and a respective second positioning parameter obtained, determining a set of positioning parameters, where the set of positioning parameters includes one first positioning parameter and one second positioning parameter.

In one embodiment, step 208 includes the following steps.

Step 2081, for a respective second positioning parameter obtained, determining a first positioning parameter corresponding to a first timestamp that is closest to a timestamp corresponding to the second positioning parameter.

Step 2082, determining the second positioning parameter and the first positioning parameter corresponding to the determined first timestamp as a set of positioning parameters.

In an embodiment provided in the present application, since the first positioning parameter includes the first timestamp, the second positioning parameter includes the second timestamp, in order to minimize errors when calculating the relative position, for a respective second positioning parameter, a first positioning parameter corresponding to a first timestamp closest to a second timestamp in the second positioning parameter is determined among the multiple first positioning parameters as the first positioning parameter for pairing. And the set of positioning parameters is formed by including the second positioning parameter and the first positioning parameter corresponding to the closest first timestamp.

Step 209, determining a relative position between the first terminal device and the second terminal device based on the first positioning parameter and the second positioning parameter included in the set of positioning parameters.

In one embodiment, step 209 includes the following steps.

Step 2091, obtaining a first time difference and a first power aperture related parameter of the first positioning parameter, and a second time difference and a second power aperture related parameter of the second positioning parameter in the set of positioning parameters.

Step 2092, determining a relative distance between the first terminal device and the second terminal device corresponding to the set of positioning parameters based on the first time difference, the second time difference, the first power aperture related parameter and the second power aperture related parameter.

It should be noted that in each first positioning parameter, if the first terminal device corresponds to multiple apertures, for each aperture of the first terminal device, there are a first time difference, a first timestamp, a first direction angle measurement parameter, and a first received power corresponding to the first signal pair. Similarly, in each second positioning parameter, if the second terminal device corresponds to multiple apertures, then for each aperture of the second terminal device, there are a second time difference, a second timestamp, a second direction angle measurement parameter, and a second received power corresponding to the second signal pair.

In an embodiment provided in the present application, the first time difference is a time difference between the receiving time of the second relative positioning reference signal and a transmitting time of the closet first relative positioning reference signal. The second time difference is a time difference between a receiving time of the first relative positioning reference signal and the transmitting time of the closet second relative positioning reference signal. Thus when calculating the relative distance between the first terminal device and the second terminal device, in order to minimize the error of the relative distance, the most appropriate first time difference and second time difference are selected based on the first power aperture related parameter and the second power aperture related parameter, an average time difference between the selected first time difference and the second time difference is calculated, and then the average time difference is multiplied by the speed of light, the relative distance between the first terminal device and the second terminal device is thus calculated.

Step 2093, obtaining a first direction angle measurement parameter and the first power aperture related parameter of the first positioning parameter, and a second direction angle measurement parameter and the second power aperture related parameter of the second positioning parameter in the set of positioning parameters.

Step 2094, determining a relative angle between the first terminal device and the second terminal device corresponding to the set of positioning parameters based on the first direction angle measurement parameter, the second direction angle measurement parameter, the first power aperture related parameter and the second power aperture related parameter.

Among them, the relative angle is an angle of counterclockwise rotation from a north direction to a position of a counterpart terminal device participating in relative positioning by taking a terminal device applying for the relative positioning as a center of a circle. In an embodiment provided in the present application, the first terminal device is the terminal device applying for relative positioning, and the second terminal device is the terminal device participating in the relative positioning, the relative angle is an angle of counterclockwise rotation from the north direction to a position of the second terminal device by taking the first terminal device as a center of a circle.

In an embodiment provided in the present application, the first direction angle measurement parameter includes a first receiving antenna direction angle and a first transmitting antenna direction angle. The second direction angle measurement parameter includes: a second receiving antenna direction angle and a second transmitting antenna direction angle. In one embodiment, the most appropriate first direction angle measurement parameter and second direction angle measurement parameter are selected firstly based on the first power aperture related parameter and the second power aperture related parameter, four direction angles in the first directional angle measurement parameter and the second direction angle measurement parameter may be averaged, and an average direction angle is determined as a corresponding relative angle between the first terminal device and the second terminal device. In one embodiment, the most appropriate first direction angle measurement parameter and second direction angle measurement parameter selected may be input into a pre-constructed relative angle determination algorithm model, and a corresponding relative angle between the first terminal device and the second terminal device is determined based on the relative angle determination algorithm model. This is not limited in an embodiment provided in the present application.

Step 2095, determining the relative distance and the relative angle as the relative position between the first terminal device and the second terminal device corresponding to the set of positioning parameters.

In an embodiment provided in the present application, as shown in FIG. 5, the relative position may be represented by a relative distance and a relative angle.

Step 210, transmitting the relative position to the second terminal device, to enable the second terminal device to correct the relative position.

In an embodiment provided in the present application, the first terminal device transmits the determined relative position to the second terminal device through the SL interface, and the second terminal device corrects the relative position transmitted by the first terminal based on the relative position determined by itself and the relative position transmitted by the first terminal device. Exemplarily, if an error between the relative positions calculated by the two terminal devices is small, it indicates that a QOS accuracy requirement is met and a correction is unnecessary. If an error between the relative positions calculated by the two terminal devices is large, it is necessary to perform measurement and calculation again to correct such relative position.

In another embodiment provided in the present application, the first terminal device may also correct the relative position determined by itself. Thus the following embodiment may also replace step 210:

receiving a relative position report transmitted by the second terminal device, and correcting the relative position based on the relative position report.

In an embodiment provided in the present application, the first terminal device receives a relative position report transmitted by the second terminal device through the SL interface, where the relative position report includes the relative position between the first terminal device and the second terminal device determined by the second terminal device. The first terminal device corrects the relative position determined by itself based on the relative position determined by itself and the relative position transmitted by the second terminal device. The specific correction method is similar to that in step 210, and will not be repeated here.

In the relative positioning method provided in an embodiment of the present application, a first terminal device teaming up first positioning parameters and second positioning parameters to form sets of positioning parameters, and determines a corresponding relative position between the first terminal device and a second terminal device for each set of positioning parameters. And the first positioning parameters are further transmitted to the second terminal device, enabling the second terminal device to team up the first positioning parameters and the second positioning parameters to form sets of positioning parameters again and determine a corresponding relative position between the first terminal device and second terminal device for each set of positioning parameters. The relative position is verified by the first terminal device or the second terminal device, which may further improve the accuracy of the relative position, and meet the accuracy requirement of QOS.

In the relative positioning method provided in an embodiment of the present application, for the respective first positioning parameter and the respective second positioning parameter obtained, the first terminal device determines a set of positioning parameters which includes one first positioning parameter and one second positioning parameter; and determines a relative position between the first terminal device and the second terminal device based on the first positioning parameter and the second positioning parameter included in the set of positioning parameters. Compared to the first positioning method in the prior art in which all terminal devices that require relative positioning need to be on-network devices, the relative positioning method provided in the embodiment of the present application can support relative positioning between off-network devices, and between an on-network device and an off-network device, weakening the restriction on network states of terminal devices during relative positioning.

It should be noted that if the first terminal device in the embodiment of the present application is an on-network device, after step 210, the following step is further included:

transmitting the relative position to a positioning server, to enable the positioning server to store the relative position.

In an embodiment provided in the present application, the on-network device is a device that is covered by a cellular network and may communicate with a positioning server.

In an embodiment provided in the present application, when the first terminal device is an on-network device, the relative position is transmitted to the positioning server through an LPP protocol, and identification information of the first terminal device and the second terminal device may also be transmitted to the positioning server when the relative position is transmitted. The positioning server stores the relative position between terminal devices covered by the cellular network, to provide the relative position between terminal devices when there is a need of obtaining the relative positions between the terminal devices. For example, in the field of Internet of Vehicles technology, a cloud server may obtain a relative position between terminal devices from the positioning server when encountering a business requirement of obtaining the relative position between the terminal devices.

In one embodiment, if the first terminal device is an off-network device and the second terminal device is an on-network device; after step 210, the following step is further included:

transmitting, to the positioning server through the second terminal device, the relative position, to enable the positioning server to store the relative position.

In an embodiment provided in the present application, when the first terminal device is an off-network device and the second terminal device is an on-network device, the first terminal device first transmits the relative position to the second terminal device through the SL interface, and then the second terminal device transmits the relative position to the positioning server through the LPP protocol.

In the relative positioning method provided in an embodiment of the present application, when at least one of the first terminal device and the second terminal device is an on-network device, it is possible to transmit the relative position between the first terminal device and second terminal device to the positioning server, meeting the business requirement of obtaining the relative position between the terminal devices.

In one embodiment, if both of the first terminal device and the second terminal device are off-network devices, the first terminal device is connected to a third terminal device through a direct communication link, and the third terminal device is an on-network device; after step 210, the following step is further included: transmitting, to a positioning server through the third terminal device, the relative position, to enable the positioning server to store the relative position.

In an embodiment provided in the present application, when both of the first and second terminal devices are off-network devices, while the third terminal device is an on-network device, and the first terminal device is connected to the third terminal device through a direct communication link, the first terminal device first transmits the relative position to the third terminal device through the SL interface, and then the third terminal device transmits the relative position to the positioning server through the LPP protocol.

In the relative positioning method provided in an embodiment of the present application, the relative position may also be transmitted to the positioning server through the on-network third terminal device when both of the first terminal device and the second terminal device are off-network devices, meeting the business requirement of obtaining the relative position between terminal devices. Furthermore, compared to the first positioning method in the prior art in which all terminal devices that require relative positioning need to be on-network devices, the relative positioning method provided in the present application embodiment can support relative positioning between an off-network device and another off-network device, further weakening the restriction on network states of the terminal devices during relative positioning.

Embodiment III

FIG. 7 is a flowchart of a relative positioning method provided in yet another embodiment of the present application. As shown in FIG. 7, an execution subject body of the relative positioning method in an embodiment of the present application is a second terminal device, where a first terminal device is a terminal device applying for relative positioning, and the second terminal device is a counterpart terminal device participating in the relative positioning. The relative positioning method provided in an embodiment of the present application includes the following steps.

Step 301, receiving a relative positioning request transmitted by a first terminal device.

Step 302, generating, based on the relative positioning request, a second relative positioning reference signal.

In one embodiment, step 302 includes the following steps.

Step 3021, obtaining, based on the relative positioning request, configuration information for a relative positioning reference signal from a network side device.

Step 3022, generating, based on the configuration information for the relative positioning reference signal, a second relative positioning reference signal.

In an embodiment provided in the present application, the implementation manner of step 302 is similar to the implementation manner of step 201 in Embodiment II of the present application, which will not be repeated here.

Step 303, transmitting multiple second relative positioning reference signals to the first terminal device.

In one embodiment, in an embodiment provided by the present application, step 303 includes the following steps.

Step 3031, obtaining, based on the relative positioning request, pre-authorized spectrum resource information.

Step 3032, transmitting, based on the spectrum resource information, the second relative positioning reference signal.

In an embodiment provided in the present application, the implementation manner of step 303 is similar to the implementation manner of step 202 in Embodiment II of the present application, which will not be repeated here.

Step 304, receiving multiple first relative positioning reference signals transmitted by the first terminal device.

Step 305, for each of the received first relative positioning reference signals, determining a second relative positioning reference signal closest to the first relative positioning reference signal; and obtaining, based on the first relative positioning reference signal and the determined second relative positioning reference signal, a second positioning parameter corresponding to a second signal pair including the first relative positioning reference signal and the determined second relative positioning reference signal.

In an embodiment provided in the present application, the implementation manner of step 305 is similar to the implementation manner of step 204 to step 205 in Embodiment II of the present application, which will not be repeated here.

Step 306, receiving multiple first positioning parameters transmitted by the first terminal device.

Step 307, transmitting the second positioning parameters to the first terminal device, to enable the first terminal device to determine a set of positioning parameters based on the respective first positioning parameter and the respective second positioning parameter obtained, where the set of positioning parameters includes one first positioning parameter and one second positioning parameter, and to determine a relative position between the first terminal device and the second terminal device based on the first positioning parameter and the second positioning parameter included in the set of positioning parameters.

Step 308, for a respective second positioning parameter and a respective first positioning parameter obtained, determining a set of positioning parameters, where the set of positioning parameters includes one second positioning parameter and one first positioning parameter.

Step 309, determining, based on the second positioning parameter and the first positioning parameter included in the set of positioning parameters, a relative position between the first terminal device and the second terminal device.

Step 310, transmitting the relative position to the first terminal device, to enable the first terminal device to correct the relative position.

In an embodiment provided in the present application, the implementation manner of step 304 to step 310 is similar to the corresponding steps in Embodiment II of the present application, which will not be repeated here.

In the relative positioning method provided in the embodiment of the present application, for a respective second positioning parameter and a respective first positioning parameter obtained, a second terminal device determines a set of positioning parameters, where the set of positioning parameters includes one second positioning parameter and one first positioning parameter; determines a relative position between the first terminal device and the second terminal device based on the second positioning parameter and the first positioning parameter included in the set of positioning parameters; transmits the relative position to the first terminal device, to enable the first terminal device to correct the relative position, thus further improving the accuracy of the relative position, and meeting the accuracy requirement of QOS.

Embodiment IV

FIG. 8 is a flowchart of a relative positioning method provided in yet another embodiment of the present application. As shown in FIG. 8, the relative positioning method provided in an embodiment of the present application is an embodiment in which, based on the relative positioning method provided in Embodiment I of the present application, a positioning server teams up first positioning parameters and second positioning parameters to form sets of positioning parameters, and determines a corresponding relative position between the first terminal device and the second terminal device for each set of positioning parameters, where the first terminal device is an on-network device applying for relative positioning, while the second terminal device is an off-network terminal. The embodiment of the present application includes the following steps.

Step 401, generating a first relative positioning reference signal.

Step 402, transmitting multiple first relative positioning reference signals to the second terminal device.

Step 403, receiving multiple second relative positioning reference signals transmitted by the second terminal device.

Step 404, for each of the received second relative positioning reference signals, determining a first relative positioning reference signal closest to the second relative positioning reference signal, and obtaining, based on the second relative positioning reference signal and the determined first relative positioning reference signal, a first positioning parameter corresponding to a first signal pair including the second relative positioning reference signal and the determined first relative positioning reference signal.

Step 405, receiving multiple second positioning parameters transmitted by the second terminal device.

In an embodiment provided in the present application, the implementation manner of step 401 to step 405 is similar to the implementation manner of step 201 to step 206 in Embodiment II of the present application, which will not be repeated here.

Step 406, transmitting the first positioning parameters and the second positioning parameters to the positioning server, to enable the positioning server to team up the first positioning parameters and the second positioning parameters to form sets of positioning parameters, and to determine a corresponding relative position between the first terminal device and the second terminal device for each set of positioning parameters.

In an embodiment provided in the present application, a first terminal device transmits first positioning parameters and second positioning parameters to a positioning server through an LPP protocol. For a respective first positioning parameter and a respective second positioning parameter obtained, the positioning server determines a set of positioning parameters including one first positioning parameter and one second positioning parameter, and determines a relative position between the first terminal device and a second terminal device based on the first positioning parameter and the second positioning parameter included in the set of positioning parameters.

It should be noted that the way in which the positioning server determines, for the respective first positioning parameter and the respective second positioning parameter obtained, a set of positioning parameters including one first positioning parameter and one second positioning parameter, and determines a relative position between the first terminal device and the second terminal device based on the first positioning parameter and the second positioning parameter included in the set of positioning parameters, is similar to the way in which the corresponding scheme is executed by the first terminal device, which will not be repeated here.

Step 407, receiving the relative position transmitted by the positioning server.

Step 408, transmitting the relative position to the second terminal device.

In an embodiment provided in the present application, the positioning server transmits the relative position between the first terminal device and the second terminal device to the first terminal device through the LPP protocol after calculating the relative position. And the first terminal device transmits the relative position to the second terminal device through the SL interface.

In the relative positioning method provided in an embodiment of the present application, when the first terminal device is an on-network device applying for relative positioning and the second terminal device is an off-network terminal, the first positioning parameters and the second positioning parameters may be transmitted to the positioning server; for a respective first positioning parameter and a respective second positioning parameter obtained, the positioning server determines a set of positioning parameters including one first positioning parameter and one second positioning parameter, determines a relative position between the first terminal device and the second terminal device based on the first positioning parameter and the second positioning parameter included in the set of positioning parameters, and transmits the relative position to the first terminal device; the first terminal device transmits the relative position to the second terminal device, thus effectively reducing the computational cost for determining the relative position of terminal devices.

Embodiment V

FIG. 9 is a flowchart of a relative positioning method provided in yet another embodiment of the present application. As shown in FIG. 9, the relative positioning method provided in an embodiment of the present application is an embodiment in which, based on the relative positioning method provided in Embodiment I of the present application, a positioning server determines, for a respective first positioning parameter and a respective second positioning parameter obtained, a set of positioning parameters including one first positioning parameter and one second positioning parameter, and determines the relative position between the first terminal device and the second terminal device based on the first positioning parameter and the second positioning parameter included in the set of positioning parameters, an embodiment is used to determine t. Among them, the first terminal device is an off-network terminal device applying for relative positioning, and the second terminal device is an on-network terminal. The embodiment of the present application includes the following steps.

Step 501, generating a first relative positioning reference signal.

Step 502, transmitting multiple first relative positioning reference signals to a second terminal device.

Step 503, receiving multiple second relative positioning reference signals transmitted by the second terminal device.

Step 504, for each of the received second relative positioning reference signals, determining a first relative positioning reference signal closest to the second relative positioning reference signal, and obtaining, based on the second relative positioning reference signal and the determined first relative positioning reference signal, a first positioning parameter corresponding to a first signal pair including the second relative positioning reference signal and the determined first relative positioning reference signal.

Step 505, receiving multiple second positioning parameters transmitted by the second terminal device.

In an embodiment provided in the present application, the implementation manner of step 501 to step 505 is similar to the implementation manner of step 401 to step 405 in Embodiment IV of the present application, which will not be repeated here.

Step 506, transmitting, to the positioning server through the second terminal device, the first positioning parameters and the second positioning parameters, to enable the positioning server to determine, for a respective first positioning parameter and a respective second positioning parameter obtained, a set of positioning parameters including one first positioning parameter and one second positioning parameter, and to determine a relative position between the first terminal device and the second terminal device based on the first positioning parameter and the second positioning parameter included in the set of positioning parameters.

In an embodiment provided in the present application, the first terminal device transmits the first positioning parameters and the second positioning parameters to the second terminal device through the SL interface. The second terminal device is an on-network device that transmits the first positioning parameters and the second positioning parameters to the positioning server through the LPP protocol. For a respective first positioning parameter and a respective second positioning parameter obtained, the positioning server determines a set of positioning parameters including one first positioning parameter and one second positioning parameter, and determines a relative position between the first terminal device and the second terminal device based on the first positioning parameter and the second positioning parameter included in the set of positioning parameters.

It should be noted that, the way in which the positioning server determines, for a respective first positioning parameter and a respective second positioning parameter obtained, a set of positioning parameters including one first positioning parameter and one second positioning parameter, and determines a relative position between the first terminal device and the second terminal device based on the first positioning parameter and the second positioning parameter included in the set of positioning parameters, is similar to the way in which the corresponding scheme is executed by the first terminal device, which will not be repeated here.

Step 507, receiving the relative position transmitted by the positioning server through the second terminal device.

In an embodiment provided in the present application, the positioning server transmits the relative position between the first terminal device and the second terminal device to the second terminal device through the LPP protocol after calculating the relative position. The second terminal device transmits the relative position to the first terminal device through the SL interface.

In the relative positioning method provided in an embodiment of the present application, when the first terminal device is an off-network device applying for relative positioning and the second terminal is an on-network terminal, the first positioning parameters and the second positioning parameters may be transmitted to the positioning server through the second terminal device; for a respective first positioning parameter and a respective second positioning parameter obtained, the positioning server determines a set of positioning parameters including one first positioning parameter and one second positioning parameter, determines a relative position between the first terminal device and the second terminal device based on the first positioning parameter and the second positioning parameter included in the set of positioning parameters, and transmits the relative position to the second terminal device; the second terminal device transmits the relative position to the first terminal device, thus effectively reducing the computational cost for determining the relative position of terminal devices.

Embodiment VI

FIG. 10 is a flowchart of a relative positioning method provided in yet another embodiment of the present application. As shown in FIG. 10, the relative positioning method provided in an embodiment of the present application is an embodiment in which, based on the relative positioning method provided in Embodiment I of the present application, a positioning server teams up first positioning parameters and second positioning parameters to form sets of positioning parameters, and determines the corresponding relative position between the first terminal device and the second terminal device for each set of positioning parameters, where the first terminal device is an off-network device applying for relative positioning, and the second terminal device is an off-network terminal. The embodiment of the present application includes the following steps.

Step 601, generating a first relative positioning reference signal.

Step 602, transmitting multiple first relative positioning reference signals to a second terminal device.

Step 603, receiving multiple second relative positioning reference signals transmitted by the second terminal device.

Step 604, for each of the received second relative positioning reference signals, determining a first relative positioning reference signal closest to the second relative positioning reference signal, and obtaining, based on the second relative positioning reference signal and the determined first relative positioning reference signal, a first positioning parameter corresponding to a first signal pair including the second relative positioning reference signal and the determined first relative positioning reference signal.

Step 605, receiving multiple second positioning parameters from the second terminal device.

In an embodiment provided in the present application, the implementation manner of step 601 to step 605 is similar to the implementation manner of step 501 to step 505 in Embodiment V of the present application, and will not be repeated here.

Step 606, transmitting, to the positioning server through a third terminal device, the first positioning parameters and the second positioning parameters, to enable the positioning server to determine, for a respective first positioning parameter and a respective second positioning parameter obtained, a set of positioning parameters including one first positioning parameter and one second positioning parameter, and to determine a relative position between the first terminal device and the second terminal device based on the first positioning parameter and the second positioning parameter included in the set of positioning parameters.

In an embodiment provided in the present application, the first terminal device determines a third terminal device with which a direct communication link for realizing a communication connection relationship is available, gets knowledge that the third terminal device is an on-network device, and transmits the first positioning parameters and the second positioning parameters to the third terminal device through the SL interface. The third terminal device transmits the first positioning parameters and the second positioning parameters to the positioning server through the LPP protocol. For a respective first positioning parameter and a respective second positioning parameter obtained, the positioning server determines a set of positioning parameters including one first positioning parameter and one second positioning parameter, and determines a relative position between the first terminal device and the second terminal device based on the first positioning parameter and the second positioning parameter included in the set of positioning parameters.

Step 607, receiving the relative position transmitted by the positioning server through the third terminal device.

In an embodiment provided in the present application, the positioning server transmits the relative position between the first terminal device and the second terminal device to the third terminal device through the LPP protocol after calculating the relative position. The third terminal device transmits the relative position to the first terminal device and the second terminal device through SL interfaces.

In the relative positioning method provided in an embodiment of the present application, when both of the first terminal device and the second terminal device are off-network devices, the first terminal device is connected to the third terminal device through a direct communication link, and the third terminal device is an on-network device, the first positioning parameters and the second positioning parameters may be transmitted to the positioning server through the third terminal device; for a respective first positioning parameter and a respective second positioning parameter obtained, the positioning server determines a set of positioning parameters including one first positioning parameter and one second positioning parameter, determines a relative position between the first terminal device and the second terminal device based on the first positioning parameter and the second positioning parameter included in the set of positioning parameters, and transmits the relative position to the third terminal device; the third terminal device transmits the relative position to the first terminal device and the second terminal device. In this way, the computational cost for determining the relative position of terminal devices can be effectively reduced. Furthermore, compared to the first positioning method in the prior art in which all terminal devices that require relative positioning need to be on-network devices, the relative positioning method provided in the present application embodiment can support relative positioning between an off-network device and another off-network device, further weakening the restriction on network states of the terminal devices during relative positioning.

Embodiment VII

Figure 11:
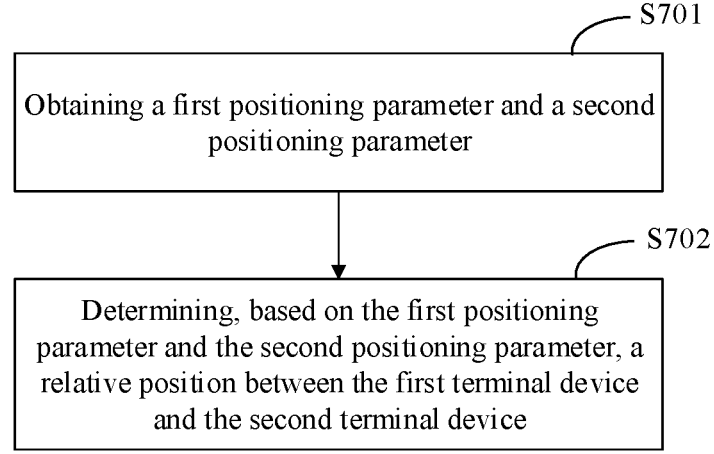
FIG. 11 is a flowchart of the relative positioning method provided in another embodiment of the present application.

FIG. 11 is a flowchart of the relative positioning method provided in another embodiment of the present application. As shown in FIG. 11, the execution subject body of the relative positioning method provided in an embodiment of the present application is a relative positioning apparatus which is located in a positioning server. Therefore, the relative positioning method provided in an embodiment of the present application includes the following steps.

Step 701, obtaining a first positioning parameter and a second positioning parameter.

Among them, the first positioning parameter is a positioning parameter corresponding to a second relative positioning reference signal and a first relative positioning reference signal determined by the first terminal device, and the second positioning parameter is a positioning parameter corresponding to the first relative positioning reference signal and the second relative positioning reference signal determined by the second terminal device, the first relative positioning reference signal is transmitted by the first terminal device to the second terminal device, and the second relative positioning reference signal is received by the first terminal device and transmitted by the second terminal device.

In an embodiment provided in the present application, if any one of the first terminal device and the second terminal device is an on-network device, the positioning server receives the first positioning parameter and the second positioning parameter transmitted by the on-network device. If both of the first terminal device and the second terminal device are off-network devices, the first terminal device transmits the first positioning parameter and the second positioning parameter to the positioning server through an on-network third terminal device, and the positioning server receives the first positioning parameter and the second positioning parameter transmitted by the third terminal device.

Step 702, determining, based on the first positioning parameter and the second positioning parameter, a relative position between the first terminal device and the second terminal device.

In an embodiment provided in the present application, if there are multiple first relative positioning reference signals and multiple second relative positioning reference signals, step 702 specifically includes:

for a respective first positioning parameter and a respective second positioning parameter obtained, determining a set of positioning parameters, where the set of positioning parameters includes one first positioning parameter and one second positioning parameter; and determining, based on the first positioning parameter and the second positioning parameter included in the set of positioning parameters, the relative position between the first terminal device and the second terminal device.

The specific implementation manner of step 702 is similar to the implementation manner of step 208 to step 209 performed by the first terminal device in Embodiment II of the present application, which will not be repeated here.

In one embodiment, in an embodiment provided in the present application, the following embodiment is also included:

obtaining the relative position between the first terminal device and the second terminal device determined by the first terminal device; and storing the relative position.

In an embodiment provided in the present application, if the first terminal device or the second terminal device is an on-network device, the positioning server receives, through an on-network device, the relative position between the first terminal device and the second terminal device determined by the first terminal device, and stores the relative position. It is possible to provide the relative position between terminal devices when there is a need of obtaining the relative position between the terminal devices. For example, in the field of Internet of Vehicles technology, a cloud server may obtain a relative position between terminal devices from the positioning server when encountering a business requirement of obtaining the relative position between the terminal devices.

In an embodiment provided in the present application, the first terminal device is connected to the third terminal device through a direct communication link. The third terminal device is an on-network device. The obtaining the relative position between the first terminal device and the second terminal device determined by the first terminal device includes:

receiving the relative position between the first terminal device and the second terminal device transmitted by the third terminal device.

In an embodiment provided in the present application, if both of the first terminal device and the second terminal device are off-network devices, and the third terminal device is an on-network device, it is possible to obtain the relative position between the first terminal device and the second terminal device by receiving the relative position between the first terminal device and the second terminal device transmitted by the third terminal device.

In the relative positioning method provided in an embodiment of the present application, by obtaining the first positioning parameter and the second positioning parameter, and determining the relative position between the first terminal device and the second terminal device based on the first positioning parameter and the second positioning parameter, it is possible to effectively reduce the computational cost for determining the relative position of terminal devices. Furthermore, by storing the relative position between the first terminal device and the second terminal device, the business requirement of obtaining all relative positions between the first terminal device and second terminal device can be met.

Embodiment 8

Figure 12:
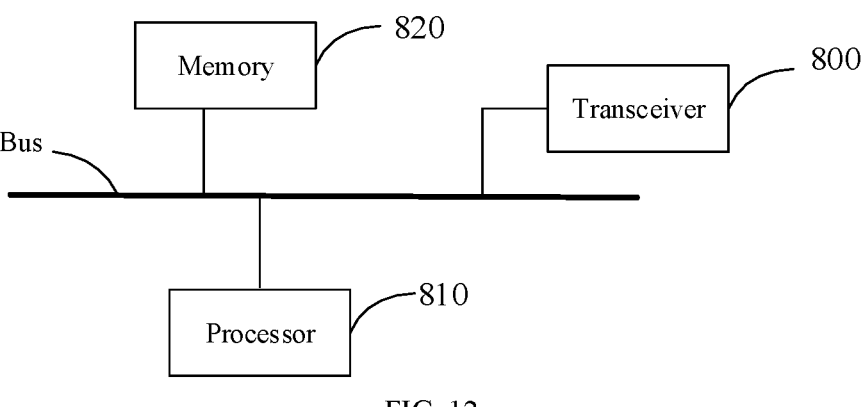
FIG. 12 is a structural schematic diagram of a relative positioning apparatus provided in an embodiment of the present application.

FIG. 12 is a structural schematic diagram of a relative positioning apparatus provided in an embodiment of the present application. As shown in FIG. 12, the relative positioning apparatus provided in the embodiment of the present application is located in a first terminal device, and the first terminal device is connected to a second terminal device through a direct communication link. The relative positioning apparatus provided in an embodiment of the present application includes a transceiver 800 for receiving and transmitting data under control of a processor 810.

In FIG. 12, a bus architecture may include any number of interconnected buses and bridges. In one embodiment, one or more processors represented by the processor 810 and various circuits of memory represented by a memory 820 are linked together. The bus architecture may also link various other circuits together, such as, a peripheral device, a voltage regulator and a power management circuit, which are well known in the art. Therefore, the details will not be further described herein. The bus interface provides interfaces. The transceiver 800 may be multiple elements, including a transmitter and a receiver, providing a unit for communicating with various other devices via a transmission medium, including a wireless channel, a wired channel, an optical cable and other transmission mediums. The processor 810 is responsible for managing the bus architecture and general processing, and the memory 820 may store data used by the processor 810 when performing an operation.

The processor 810 may be a central processing unit (CPU), an application specific integrated circuit (ASIC), a field-programmable gate array (FPGA) or a complex programmable logic device (CPLD), and the processor may also adopt a multi-core architecture.

In an embodiment provided in the present application, the memory 820 is configured to store a computer program; the transceiver 800 is configured to transmit and receive data under control of the processor 810; the processor 810 is configured to read the computer program in the memory and perform following operations:

transmitting a first relative positioning reference signal to the second terminal device, and receiving a second relative positioning reference signal transmitted by the second terminal device; determining a first positioning parameter corresponding to the received second relative positioning reference signal and the first relative positioning reference signal; receiving a second positioning parameter transmitted by the second terminal device, where the second positioning parameter is determined by the second terminal based on the received first relative positioning reference signal and the second relative positioning reference signal; and determining, based on the first positioning parameter and the second positioning parameter, a relative position between the first terminal device and the second terminal device.

In another embodiment provided in the present application, if there are multiple first relative positioning reference signals and multiple second relative positioning reference signals; when determining the first positioning parameter corresponding to the received second relative positioning reference signal and the first relative positioning reference signal, the processor 810 specifically includes:

for each of the received second relative positioning reference signals, determining a first relative positioning reference signal closest to the second relative positioning reference signal;

obtaining, based on the second relative positioning reference signal and the determined first relative positioning reference signal, a first positioning parameter corresponding to a first signal pair including the second relative positioning reference signal and the determined first relative positioning reference signal In another embodiment provided in the present application, the first positioning parameter includes: a first time difference and a first timestamp, where the first time difference is a time difference between a receiving time of the second relative positioning reference signal and a transmitting time of the first relative positioning reference signal in a first signal pair; the first timestamp is a moment at which the first time difference is determined.

In another embodiment provided in the present application, the first positioning parameter further includes: a first direction angle measurement parameter and a first power aperture related parameter;

where the first direction angle measurement parameter includes: a first receiving antenna direction angle, a first transmitting antenna direction angle; and the first power aperture related parameter includes: a first received power, a first multipath received power, a first NLOS path, and a first LOS path.

In another embodiment provided in the present application, when being configured to determine the relative position between the first terminal device and the second terminal device based on the first positioning parameter and the second positioning parameter, the processor 810 specifically includes:

for a respective first positioning parameter and a respective second positioning parameter obtained, determining a set of positioning parameters, where the set of positioning parameters includes one first positioning parameter and one second positioning parameter; and determining, based on the first positioning parameter and the second positioning parameter included in the set of positioning parameters, the relative position between the first terminal device and the second terminal device.

In another embodiment provided in the present application, when being configured to determine the set of positioning parameters, the processor 810 specifically includes:

for a respective second positioning parameter, determining a first positioning parameter corresponding to a first timestamp that is closest to a timestamp corresponding to the second positioning parameter; and determining the second positioning parameter and the first positioning parameter corresponding to the determined first timestamp as a set of positioning parameters.

In another embodiment provided in the present application, when being configured to determine the relative position between the first terminal device and the second terminal device based on the first positioning parameter and the second positioning parameter included in the set of positioning parameters, the processor 810 specifically includes:

obtaining a first time difference and a first power aperture related parameter of the first positioning parameter, and a second time difference and a second power aperture related parameter of the second positioning parameter in the set of positioning parameters; determining a relative distance between the first terminal device and the second terminal device corresponding to the set of positioning parameters based on the first time difference, the second time difference, the first power aperture related parameter and the second power aperture related parameter; obtaining a first direction angle measurement parameter and the first power aperture related parameter of the first positioning parameter, and a second direction angle measurement parameter and the second power aperture related parameter of the second positioning parameter in the set of positioning parameters; determining a relative angle between the first terminal device and the second terminal device corresponding to the set of positioning parameters based on the first direction angle measurement parameter, the second direction angle measurement parameter, the first power aperture related parameter and the second power aperture related parameter; where the relative angle is an angle of counterclockwise rotation from a north direction to a position of a counterpart terminal device participating in relative positioning by taking a terminal device applying for the relative positioning as a center of a circle; and determining the relative distance and the relative angle as the relative position between the first terminal device and the second terminal device corresponding to the set of positioning parameters.

In another embodiment provided in the present application, after being configured to determine the first positioning parameter, the processor 810 further includes:

transmitting the first positioning parameter to the second terminal device, to enable the second terminal device to determine the relative position between the first terminal device and the second terminal device based on the first positioning parameter and the second positioning parameter;

after being configured to determine the relative position between the first terminal device and the second terminal device, the processor 810 further includes:

transmitting the relative position to the second terminal device, to enable the second terminal device to correct the determined relative position.

In another embodiment provided in the present application, the processor 810 is further configured to:

receive a relative position report transmitted by the second terminal device; and correct the relative position based on the relative position report.

In another embodiment provided in the present application, after the processor 810 is used to receive the second positioning parameter, further includes:

transmitting the first positioning parameter and the second positioning parameter to a positioning server, to enable the positioning server to determine the relative position between the first terminal device and the second terminal device based on the first positioning parameter and the second positioning parameter received.

In another embodiment provided in the present application, the first terminal device is connected to a third terminal device through a direct communication link, and the third terminal device is an on-network device;

after being configured to receive the second positioning parameter, the processor 810 further includes:

transmitting, to a positioning server through the third terminal device, the first positioning parameter and the second positioning parameter, to enable the positioning server to determine the relative position between the first terminal device and the second terminal device based on the first positioning parameter and the second positioning parameter received.

In another embodiment provided in the present application, after being configured to determine the relative position between the first terminal device and the second terminal device, the processor 810 further includes:

transmitting the relative position to a positioning server, to enable the positioning server to store the relative position.

In another embodiment provided in the present application, the first terminal device is connected to a third terminal device through a direct communication link, and the third terminal device is an on-network device;

after being configured to determine the relative position between the first terminal device and the second terminal device, the processor 810 further includes:

transmitting, to a positioning server through the third terminal device, the relative position, to enable the positioning server to store the relative position.

In another embodiment provided in the present application, before being configured to transmit the first relative positioning reference signal to the second terminal device, the processor 810 further includes:

transmitting a relative positioning request to a network side device, where the relative positioning request is used for instructing the network side device to transmit configuration information for a relative positioning reference signal to the first terminal device and the second terminal device; receiving the configuration information for the relative positioning reference signal transmitted by the network side device; and generating, based on the configuration information for the relative positioning reference signal, the first relative positioning reference signal.

In another embodiment provided in the present application, when being configured to transmit the first relative positioning reference signal to the second terminal device, the processor 810 includes:

obtaining pre-authorized spectrum resource information; and transmitting, based on the spectrum resource information, the first relative positioning reference signal.

It should be noted that the above apparatus provided in the present application can achieve all the method steps implemented in the corresponding method embodiment, and can achieve the same technical effect. Therefore, the same parts and beneficial effects in an embodiment of the present application and the method embodiments will not be described herein in detail.

Embodiment IX

Figure 13:
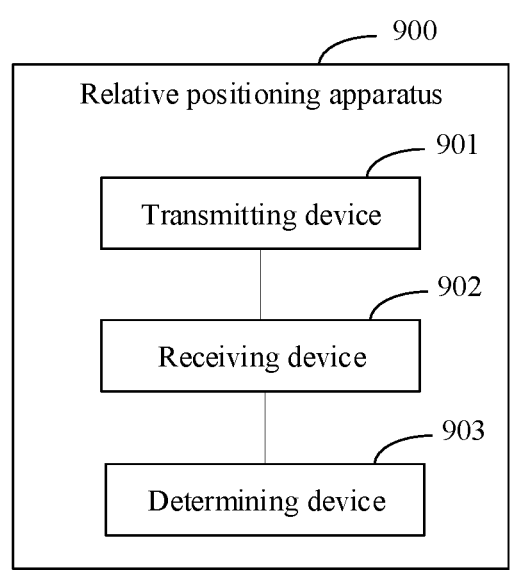
FIG. 13 is a structural schematic diagram of a relative positioning apparatus provided in another embodiment of the present application.

FIG. 13 is a structural schematic diagram of a relative positioning apparatus provided in another embodiment of the present application. As shown in FIG. 13, the relative positioning apparatus provided in an embodiment of the present application is located in a first terminal device, which is connected to a second terminal device through a direct communication link. The relative positioning apparatus 900 provided in an embodiment of the present application includes a transmitting device 901, a receiving device 902, and a determining device 903.

Among them, the transmitting device 901 is configured to transmit a first relative positioning reference signal to the second terminal device. The receiving device 902 is configured to receive a second relative positioning reference signal transmitted by the second terminal device. The determining device 903 is configured to determine a first positioning parameter corresponding to the received second relative positioning reference signal and the first relative positioning reference signal. The receiving device 902 is further configured to receive a second positioning parameter transmitted by the second terminal device, where the second positioning parameter is determined by the second terminal based on the received first relative positioning reference signal and the second relative positioning reference signal. The determining device 903 is further configured to determine a relative position between the first terminal device and the second terminal device based on the first positioning parameter and the second positioning parameter.

In another embodiment provided in the present application, if there are multiple first relative positioning reference signals and multiple second relative positioning reference signals; when determining the first positioning parameter corresponding to the received second relative positioning reference signal and the first relative positioning reference signal, the determining device 930 is specifically configured to:

for each of the received second relative positioning reference signals, determine the first relative positioning reference signal closest to the second relative positioning reference signal; obtain a first positioning parameter corresponding to a first signal pair including the second relative positioning reference signal and the determined first relative positioning reference signal based on the second relative positioning reference signal and the determined first relative positioning reference signal.

In another embodiment provided in the present application, the first positioning parameter includes: a first time difference and a first timestamp, where the first time difference is a time difference between a receiving time of the second relative positioning reference signal and a transmitting time of the first relative positioning reference signal in a first signal pair; the first timestamp is a moment at which the first time difference is determined.

In another embodiment provided in the present application, the first positioning parameter further includes: a first direction angle measurement parameter and a first power aperture related parameter;

where the first direction angle measurement parameter includes: a first receiving antenna direction angle, a first transmitting antenna direction angle; and the first power aperture related parameter includes: a first received power, a first multipath received power, a first NLOS path, and a first LOS path.

In another embodiment provided in the present application, when determining the relative position between the first terminal device and the second terminal device based on the first positioning parameter and the second positioning parameter, the determining device 903 is specifically configured to:

for a respective first positioning parameter and a respective second positioning parameter obtained, determine a set of positioning parameters, where the set of positioning parameters includes one first positioning parameter and one second positioning parameter; determine the relative position between the first terminal device and the second terminal device based on the first positioning parameter and the second positioning parameter included in the set of positioning parameters.

In another embodiment provided in the present application, when determining the set of positioning parameters, the determining device 903 is specifically configured to:

for a respective second positioning parameter, determine a first positioning parameter corresponding to a first timestamp that is closest to a timestamp corresponding to the second positioning parameter; determine the second positioning parameter and the first positioning parameter corresponding to the determined first timestamp as a set of positioning parameters.

In another embodiment provided in the present application, when determining the relative position between the first terminal device and the second terminal device based on the first positioning parameter and the second positioning parameter included in the set of positioning parameters, the determining device 903 is specifically configured to:

obtain a first time difference and a first power aperture related parameter of the first positioning parameter, and a second time difference and a second power aperture related parameter of the second positioning parameter in the set of positioning parameters; determine a relative distance between the first terminal device and the second terminal device corresponding to the set of positioning parameters based on the first time difference, the second time difference, the first power aperture related parameter and the second power aperture related parameter; obtain a first direction angle measurement parameter and the first power aperture related parameter of the first positioning parameter, and a second direction angle measurement parameter and the second power aperture related parameter of the second positioning parameter in the set of positioning parameters; determine a relative angle between the first terminal device and the second terminal device corresponding to the set of positioning parameters based on the first direction angle measurement parameter, the second direction angle measurement parameter, the first power aperture related parameter and the second power aperture related parameter; where the relative angle is an angle of counterclockwise rotation from a north direction to a position of a counterpart terminal device participating in relative positioning by taking a terminal device applying for the relative positioning as a center of a circle; determine the relative distance and the relative angle as the relative position between the first terminal device and the second terminal device corresponding to the set of positioning parameters.

In another embodiment provided in the present application, the transmitting device 901 is further configured to transmit the first positioning parameter to the second terminal device, to enable the second terminal device to determine the relative position between the first terminal device and the second terminal device based on the first positioning parameter and the second positioning parameter. The transmitting device 901 is further configured to transmit the relative position to the second terminal device, to enable the second terminal device to correct the determined relative position.

In another embodiment provided by the present application, the relative positioning apparatus further includes a correcting device;

the receiving device 902 is further configured to receive a relative position report transmitted by the second terminal device, and the correcting device is further configured to correct the relative position based on the relative position report.

In another embodiment provided in the present application, the transmitting device 901 is further configured to transmit the first positioning parameter and the second positioning parameter to a positioning server, to enable the positioning server to determine the relative position between the first terminal device and the second terminal device based on the first positioning parameter and the second positioning parameter received.

In another embodiment provided in the present application, the first terminal device is connected to a third terminal device through a direct communication link, and the third terminal device is an on-network device. The transmitting device 901 is further configured to transmit the first positioning parameter and the second positioning parameter to a positioning server through the third terminal device, to enable the positioning server to determine the relative position between the first terminal device and the second terminal device based on the first positioning parameter and the second positioning parameter received.

In another embodiment provided in the present application, the transmitting device 901 is further configured to transmit the relative position to a positioning server, to enable the positioning server to store the relative position.

In another embodiment provided in the present application, the transmitting device 901 is further configured to transmit the relative position to the positioning server through a third terminal device, to enable the positioning server to store the relative position.

In another embodiment provided by the present application, the relative positioning apparatus also includes a generating device. The transmitting device 901 is further configured to transmit a relative positioning request to a network side device, where the relative positioning request is used for instructing the network side device to transmit configuration information for a relative positioning reference signal to the first terminal device and the second terminal device; the receiving device 902 is further configured to receive the configuration information for the relative positioning reference signal transmitted by the network side device. And the generating device is configured to generate the first relative positioning reference signal based on the configuration information for the relative positioning reference signal.

In another embodiment provided in the present application, when transmitting the first relative positioning reference signal to the second terminal device, the transmitting device 901 is specifically configured to obtain pre-authorized spectrum resource information; and transmit the first relative positioning reference signal based on the spectrum resource information.

Among them, the method and apparatus are based on the same application concept. Due to similar principles of solving problems in the method and the apparatus, reference may be made to each other for the implementation of the apparatus and the method, and repetitions will not be omitted.

Embodiment X

Figure 14:
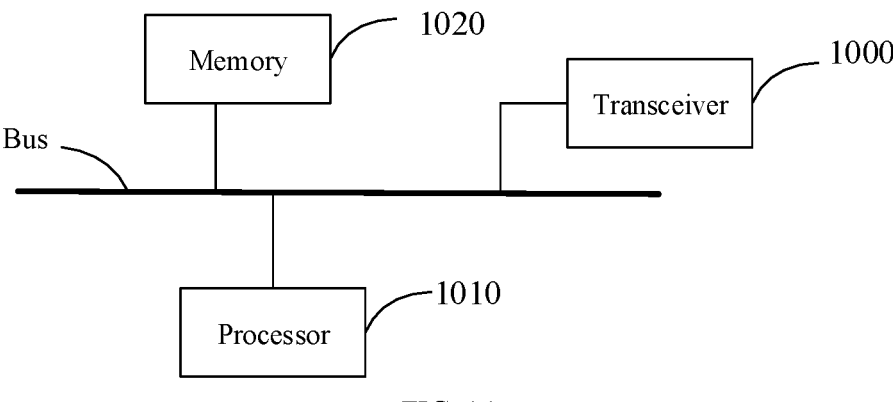
FIG. 14 is a structural schematic diagram of a relative positioning apparatus provided in yet another embodiment of the present application.

FIG. 14 is a structural schematic diagram of a relative positioning apparatus provided in yet another embodiment of the present application. As shown in FIG. 14, the relative positioning apparatus provided in an embodiment of the present application is located in a positioning server, and a first terminal device and a second terminal device are connected through a direct communication link. The relative positioning apparatus provided in an embodiment of the present application includes a transceiver 1000 configured for receiving and transmitting data under control of a processor 1010.

In FIG. 14, a bus architecture may include any number of interconnected buses and bridges. In one embodiment, one or more processors represented by the processor 1010 and various circuits of memory represented by a memory 1020 are linked together. The bus architecture may also link various other circuits together, such as, a peripheral device, a voltage regulator and a power management circuit, which are well known in the art. Therefore, the details will not be further described herein. The bus interface provides interfaces. The transceiver 1000 may be multiple elements, including a transmitter and a receiver, providing a device for communicating with various other devices via a transmission medium, including a wireless channel, a wired channel, an optical cable and other transmission mediums. The processor 1010 is responsible for managing the bus architecture and general processing, and the memory 1020 may store data used by the processor 1010 when performing an operation.

The processor 1010 may be a central processing unit (CPU), an application specific integrated circuit (ASIC), a field-programmable gate array (FPGA) or a complex programmable logic device (CPLD), and the processor may also adopt a multi-core architecture.

In an embodiment provided in the present application, the memory 1020 is configured to store a computer program; the transceiver 1000 is configured to transmit and receive data under control of the processor 1010; the processor 1010 is configured to read the computer program in the memory and perform following operations:

obtaining a first positioning parameter and a second positioning parameter, where the first positioning parameter is a positioning parameter corresponding to a second relative positioning reference signal and a first relative positioning reference signal determined by the first terminal device, and the second positioning parameter is a positioning parameter corresponding to the first relative positioning reference signal and the second relative positioning reference signal determined by the second terminal device, the first relative positioning reference signal is transmitted by the first terminal device to the second terminal device, and the second relative positioning reference signal is received by the first terminal device and transmitted by the second terminal device; and determining, based on the first positioning parameter and the second positioning parameter, a relative position between the first terminal device and the second terminal device.

In another embodiment provided in the present application, the processor 1010 is further configured to:

obtain the relative position between the first terminal device and the second terminal device determined by the first terminal device; and store the relative position.

In another embodiment provided in the present application, the first terminal device is connected to a third terminal device through a direct communication link, and when being configured to obtain the relative position between the first terminal device and the second terminal device determined by the first terminal device, the processor 1010 includes:

receiving the relative position between the first terminal device and the second terminal device transmitted by the third terminal device.

Among them, the method and apparatus are based on the same application concept. Due to similar principles of solving problems in the method and the apparatus, reference may be made to each other for the implementation of the apparatus and the method, and repetitions will not be omitted.

Embodiment XI

Figure 15:
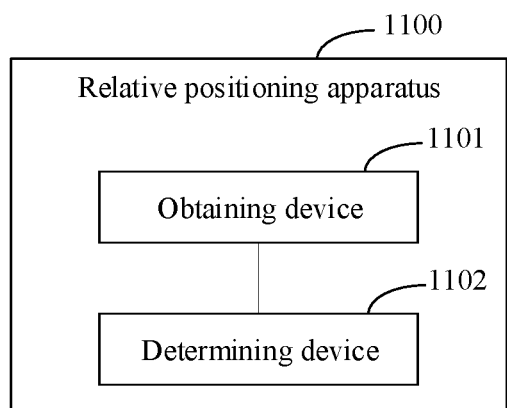
FIG. 15 is a structural schematic diagram of a relative positioning apparatus provided in yet another embodiment of the present application.

FIG. 15 is a structural schematic diagram of a relative positioning apparatus provided in yet another embodiment of the present application. As shown in FIG. 15, the relative positioning apparatus provided in an embodiment of the present application is located in a positioning server, and a first terminal device and a second terminal device are connected through a direct communication link. Therefore, the relative positioning apparatus 1100 provided in an embodiment of the present application includes an obtaining unit 1101 and a determining unit 1102.

Among them, the obtaining unit 1101 is configured to obtain a first positioning parameter and a second positioning parameter, where the first positioning parameter is a positioning parameter corresponding to a second relative positioning reference signal and a first relative positioning reference signal determined by the first terminal device, and the second positioning parameter is a positioning parameter corresponding to the first relative positioning reference signal and the second relative positioning reference signal determined by the second terminal device, the first relative positioning reference signal is transmitted by the first terminal device to the second terminal device, and the second relative positioning reference signal is received by the first terminal device and transmitted by the second terminal device. The determining unit 1102 is configured to determine a relative position between the first terminal device and the second terminal device based on the first positioning parameter and the second positioning parameter.

In another embodiment provided by the present application, the relative positioning application 1100 further includes a storing unit.

The obtaining unit 1101 is further configured to obtain the relative position between the first terminal device and the second terminal device determined by the first terminal device. The storing unit is configured to store the relative position.

In another embodiment provided in the present application, the first terminal device and the third terminal device are connected through a direct communication link. When obtaining the relative position between the first terminal device and the second terminal device determined by the first terminal device, the obtaining unit 1101 specifically includes: receiving the relative position between the first terminal device and the second terminal device transmitted by the third terminal device.

Among them, the method and apparatus are based on the same application concept. Due to similar principles of solving problems in the method and the apparatus, reference may be made to each other for the implementation of the apparatus and the method, and repetitions will not be omitted.

It should be noted that the division of units in the embodiment of the present application is illustrative, and is only a logical function division, there may be other division manners in actual implementations. In addition, each functional unit in each embodiment of the present application may be integrated in one processing unit, or may exist physically alone, or two or more units be integrated in one unit. The above integrated unit may be implemented in a form of hardware or software functional unit.

If the integrated unit is implemented in the form of software functional unit and sold or used as an independent product, it may be stored in a processor-readable storage medium. Based on this understanding, the embodiment in essence of the present application or the part that contributes to the existing technology or all or part of the embodiment may be embodied in the form of a software product, which is stored in a storage medium and includes several instructions to enable a computer device (which may be a personal computer, a server, or a network device, etc.) or a processor to perform all or a part of the steps of the method described in the embodiments of the present application. The aforementioned storage medium includes: a USB flash disk, a removable hard disk, a read-only memory (ROM), a random access memory (RAM), a magnetic disk or an optical disk or other medium that can store a program code.

Embodiment XII

An embodiment of the present application provides a processor-readable storage medium storing a computer program, where the computer program is configured to enable a processor to perform the relative positioning method provided by any one of Embodiment I to Embodiment VII.

The processor-readable storage medium may be any available medium or data storage device that the processor can access, including but not limited to a magnetic memory (such as, a floppy disk, a hard disk, a magnetic tape, a magneto-optical disk (MO), etc.), an optical memory (such as, a CD, a DVD, a BD, a HVD, etc.), and a semiconductor memory (such as, an ROM, an EPROM, an EEPROM, a non-volatile memory (NAND FLASH), a solid-state hard disk (SSD), etc.).

The embodiments of the present application can be provided as a method, a system, or a computer program product. Therefore, the present application may take the form of a complete hardware embodiment, a complete software embodiment, or an embodiment combining software and hardware aspects. Moreover, the present application may take the form of a computer program product implemented on one or more computer storage mediums (including but not limited to a disk memory and an optical memory, etc.) including computer-readable program codes.

The present application is described with reference to flow charts and/or block diagrams of the method, device (system), and computer program product according to the embodiment of the present application. It should be understood that each flow and/or block in the flow charts and/or block diagrams and the combination of flow and/or block in the flow charts and/or block diagrams can be realized by computer-executable instructions. These computer-executable instructions can be provided to a processor of a general purpose computer, a special purpose computer, an embedded processor or other programmable data processing devices to generate a machine, and the instructions executed by the processor of a computer or other programmable data processing devices generate a means for realizing the functions specified in one or more processes and/or one or more blocks of a flowchart.

These processor-executable instructions may also be stored in the processor-readable memory that can guide the computer or other programmable data processing devices to work in a specific way, and the instructions stored in the processor-readable memory generate a manufacturing product including an instruction apparatus, which implements the functions specified in one or more flows and/or one or more blocks of the flowchart.

These processor-executable instructions may also be loaded on a computer or other programmable data processing devices to enable a series of operation steps to be performed on the computer or other programmable devices to generate computer-implemented processing, and the instructions executed on the computer or other programmable devices provide steps for realizing the functions specified in one or more processes and/or one or more blocks of a flowchart.

Embodiment XIII

An embodiment of the present application provides a computer program product including a computer program, where when the computer program is executed by a processor, the relative positioning method provided by any one of Embodiment I to Embodiment VII is implemented.

Embodiment XIV

An embodiment of the present application provides a computer program, when the computer program is executed by a processor, the relative positioning method provided by any one of Embodiment I to Embodiment VII is implemented.

The invention claimed is:

1. A relative positioning method applied to a first terminal device, the first terminal device being connected to a second terminal device through a direct communication link, wherein the method comprises:

transmitting a first relative positioning reference signal to the second terminal device, and receiving a second relative positioning reference signal transmitted by the second terminal device;

determining a first positioning parameter corresponding to the received second relative positioning reference signal and the first relative positioning reference signal;

receiving a second positioning parameter transmitted by the second terminal device, wherein the second positioning parameter is determined by the second terminal based on the received first relative positioning reference signal and the second relative positioning reference signal;

determining, based on the first positioning parameter and the second positioning parameter, a relative position between the first terminal device and the second terminal device;

wherein if there are multiple first relative positioning reference signals and multiple second relative positioning reference signals; the determining the first positioning parameter corresponding to the received second relative positioning reference signal and the first relative positioning reference signal, comprises:

for each of the received second relative positioning reference signals, determining a first relative positioning reference signal closest to the second relative positioning reference signal in time, wherein a time difference between a receiving time of the second relative positioning reference signal and a transmitting time of the determined first relative positioning reference signal is a minimum time difference;

obtaining, based on the second relative positioning reference signal and the determined first relative positioning reference signal, a first positioning parameter corresponding to a first signal pair comprising the second relative positioning reference signal and the determined first relative positioning reference signal.

2. The method according to claim 1, wherein the first positioning parameter comprises: a first time difference and a first timestamp, wherein the first time difference is the time difference between the receiving time of the second relative positioning reference signal and the transmitting time of the first relative positioning reference signal in the first signal pair; the first timestamp is a moment at which the first time difference is determined.

3. The method according to claim 2, wherein the first positioning parameter further comprises: a first direction angle measurement parameter and a first power aperture related parameter;

wherein the first direction angle measurement parameter comprises: a first receiving antenna direction angle, a first transmitting antenna direction angle; and the first power aperture related parameter comprises: a first received power, a first multipath received power, a first NLOS path, and a first LOS path.

4. The method according to claim 1, wherein the determining, based on the first positioning parameter and the second positioning parameter, the relative position between the first terminal device and the second terminal device, comprises:

for a respective first positioning parameter and a respective second positioning parameter obtained, determining a set of positioning parameters, wherein the set of positioning parameters comprises one first positioning parameter and one second positioning parameter;

determining, based on the first positioning parameter and the second positioning parameter comprised in the set of positioning parameters, the relative position between the first terminal device and the second terminal device.

5. The method according to claim 4, wherein the determining the set of positioning parameters, comprises:

for a respective second positioning parameter, determining a first positioning parameter corresponding to a first timestamp that is closest to a second timestamp corresponding to the second positioning parameter in time, wherein a time difference between the first timestamp and the second timestamp is a minimum time difference;

determining the second positioning parameter and the first positioning parameter corresponding to the determined first timestamp as a set of positioning parameters.

6. The method according to claim 4, wherein the determining, based on the first positioning parameter and the second positioning parameter comprised in the set of positioning parameters, the relative position between the first terminal device and the second terminal device, comprises:

obtaining a first time difference and a first power aperture related parameter of the first positioning parameter, and a second time difference and a second power aperture related parameter of the second positioning parameter in the set of positioning parameters;

determining a relative distance between the first terminal device and the second terminal device corresponding to the set of positioning parameters based on the first time difference, the second time difference, the first power aperture related parameter and the second power aperture related parameter;

obtaining a first direction angle measurement parameter and the first power aperture related parameter of the first positioning parameter, and a second direction angle measurement parameter and the second power aperture related parameter of the second positioning parameter in the set of positioning parameters;

determining a relative angle between the first terminal device and the second terminal device corresponding to the set of positioning parameters based on the first direction angle measurement parameter, the second direction angle measurement parameter, the first power aperture related parameter and the second power aperture related parameter, wherein the relative angle is an angle of counterclockwise rotation from a north direction to a position of a counterpart terminal device participating in relative positioning by taking a terminal device applying for the relative positioning as a center of a circle;

determining the relative distance and the relative angle as the relative position between the first terminal device and the second terminal device corresponding to the set of positioning parameters.

7. The method according to claim 1, wherein after determining the first positioning parameter, the method further comprises:

transmitting the first positioning parameter to the second terminal device;

after determining the relative position between the first terminal device and the second terminal device, the method further comprises:

transmitting the relative position to the second terminal device.

8. The method according to claim 1, further comprising:

receiving a relative position report transmitted by the second terminal device;

correcting the relative position based on the relative position report.

9. The method according to claim 1, wherein after receiving the second positioning parameter, the method further comprises:

transmitting the first positioning parameter and the second positioning parameter to a positioning server.

10. The method according to claim 1, wherein the first terminal device is connected to a third terminal device through a direct communication link, and the third terminal device is an on-network device;

wherein after receiving the second positioning parameter, the method further comprises:

transmitting, to a positioning server through the third terminal device, the first positioning parameter and the second positioning parameter.

11. The method according to claim 1, wherein after determining the relative position between the first terminal device and the second terminal device, the method further comprises:

transmitting the relative position to a positioning server.

12. The method according to claim 1, wherein before transmitting the first relative positioning reference signal to the second terminal device, the method further comprises:

transmitting a relative positioning request to a network side device, wherein the relative positioning request is used for instructing the network side device to transmit configuration information for a relative positioning reference signal to the first device and the second terminal device;

receiving the configuration information for the relative positioning reference signal transmitted by the network side device;

generating, based on the configuration information for the relative positioning reference signal, the first relative positioning reference signal.

13. A non-transitory processor-readable storage medium storing a computer program, wherein the computer program is configured to enable a processor to perform the method according to claim 1.

14. The method according to claim 5, wherein the first positioning parameter comprises: a first time difference and a first timestamp, wherein the first time difference is the time difference between the receiving time of the second relative positioning reference signal and the transmitting time of the first relative positioning reference signal in the first signal pair; the first timestamp is a moment at which the first time difference is determined.

15. The method according to claim 5, wherein the second positioning parameter comprises: a second time difference and a second timestamp, wherein the second time difference is a time difference between a receiving time of a first relative positioning reference signal and a transmitting time of a second relative positioning reference signal in a second signal pair; the second timestamp is a moment at which the second time difference is determined.

16. A relative positioning method applied to a positioning server, a first terminal device and a second terminal device being connected through a direct communication link, wherein the method comprises:

obtaining a first positioning parameter and a second positioning parameter, wherein the first positioning parameter is a positioning parameter corresponding to a second relative positioning reference signal and a first relative positioning reference signal determined by the first terminal device, and the second positioning parameter is a positioning parameter corresponding to the first relative positioning reference signal and the second relative positioning reference signal determined by the second terminal device, the first relative positioning reference signal is transmitted by the first terminal device to the second terminal device, and the second relative positioning reference signal is received by the first terminal device and transmitted by the second terminal device;

determining, based on the first positioning parameter and the second positioning parameter, a relative position between the first terminal device and the second terminal device;

wherein the method further comprises:

obtaining the relative position between the first terminal device and the second terminal device determined by the first terminal device;

storing the relative position.

17. The method according to claim 16, wherein the first terminal device is connected to a third terminal device through a direct communication link, the obtaining the relative position between the first terminal device and the second terminal device determined by the first terminal device, comprises:

receiving the relative position between the first terminal device and the second terminal device transmitted by the third terminal device.

18. A relative positioning apparatus located in a positioning server, a first terminal device and a second terminal device being connected through a direct communication link, wherein the apparatus comprises:

a memory, a transceiver, a processor:

wherein the memory is configured to store a computer program; the transceiver is configured to transmit and receive data under control of the processor; and the processor is configured to read the computer program in the memory to perform the method according to claim 16.

19. A non-transitory processor-readable storage medium storing a computer program, wherein the computer program is configured to enable a processor to perform the method according to claim 16.

20. A relative positioning apparatus located in a first terminal device, the first terminal device being connected to a second terminal device through a direct communication link; wherein the apparatus comprises:

a memory, a transceiver, a processor:

wherein the memory is configured to store a computer program; the transceiver is configured to transmit and receive data under control of the processor; and the processor is configured to read the computer program in the memory and perform following operations:

transmitting a first relative positioning reference signal to the second terminal device, and receiving a second relative positioning reference signal transmitted by the second terminal device;

determining a first positioning parameter corresponding to the received second relative positioning reference signal and the first relative positioning reference signal;

receiving a second positioning parameter transmitted by the second terminal device, wherein the second positioning parameter is determined by the second terminal based on the received first relative positioning reference signal and the second relative positioning reference signal;

determining, based on the first positioning parameter and the second positioning parameter, a relative position between the first terminal device and the second terminal device;

wherein the first positioning parameter comprises: a first time difference and a first timestamp, wherein the first time difference is the time difference between a receiving time of the second relative positioning reference signal and the transmitting time of the first relative positioning reference signal in the first signal pair; the first timestamp is a moment at which the first time difference is determined.

* * * * *